(12) United States Patent
Chung et al.

(10) Patent No.: US 10,474,100 B2
(45) Date of Patent: Nov. 12, 2019

(54) DISPLAY DEVICE AND DRIVING METHOD THEREOF

(71) Applicant: LG ELECTRONICS INC., Seoul (KR)

(72) Inventors: Wooseong Chung, Seoul (KR); Chongsok Kim, Seoul (KR); Minho Lee, Seoul (KR); Seungoh Jhung, Seocho-gu (KR); Jaehan Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 120 days.

(21) Appl. No.: 15/320,237

(22) PCT Filed: Jun. 2, 2015

(86) PCT No.: PCT/KR2015/005544
§ 371 (c)(1),
(2) Date: Dec. 19, 2016

(87) PCT Pub. No.: WO2015/194773
PCT Pub. Date: Dec. 23, 2015

(65) Prior Publication Data
US 2017/0139375 A1  May 18, 2017

(30) Foreign Application Priority Data

Jun. 20, 2014 (KR) .................. 10-2014-0075997
Aug. 7, 2014 (KR) .................. 10-2014-0101500
Aug. 11, 2014 (KR) .................. 10-2014-0103278

(51) Int. Cl.
*G03H 1/08* (2006.01)
*G03H 1/00* (2006.01)
(Continued)

(52) U.S. Cl.
CPC ............ *G03H 1/08* (2013.01); *G02B 27/2221* (2013.01); *G02B 27/2278* (2013.01);
(Continued)

(58) Field of Classification Search
CPC ...... G03H 1/08; G03H 1/0005; G03H 1/2205; G03H 1/2249; G03H 2001/0061;
(Continued)

(56) References Cited

U.S. PATENT DOCUMENTS 7,614,748 B2 * 11/2009 Nayar ............... H04N 13/0242
                                                        219/121.69
2013/0022222 A1  1/2013 Zschau et al.

FOREIGN PATENT DOCUMENTS

JP  2009-86395 A     4/2009
JP  2009086395 A  *  4/2009  ............. G02B 27/22
(Continued)

*Primary Examiner* — Stephone B Allen
*Assistant Examiner* — Jyotsna V Dabbi
(74) *Attorney, Agent, or Firm* — Birch, Stewart, Kolasch & Birch, LLP

(57) ABSTRACT

A display device including a flat display unit configured to output a planar image, a hologram generation unit configured to output a hologram image, and a controller for acquiring the holographic image with respect to at least a portion of the planar image.

10 Claims, 35 Drawing Sheets

(51) Int. Cl.
*G03H 1/22* (2006.01)
*G06F 3/01* (2006.01)
*G06F 3/0488* (2013.01)
*G02B 27/22* (2018.01)
*H04N 13/393* (2018.01)
*H04N 21/47* (2011.01)

(52) U.S. Cl.
CPC ......... *G03H 1/0005* (2013.01); *G03H 1/2205* (2013.01); *G03H 1/2249* (2013.01); *G06F 3/011* (2013.01); *G06F 3/013* (2013.01); *G06F 3/0488* (2013.01); *H04N 13/393* (2018.05); *H04N 21/47* (2013.01); *G03H 2001/0061* (2013.01); *G03H 2001/2284* (2013.01); *G03H 2210/20* (2013.01); *G03H 2223/24* (2013.01)

(58) Field of Classification Search
CPC ....... G03H 2001/2284; G03H 2210/20; G03H 2223/24; G06F 3/011; G06F 3/013; G06F 3/0488; H04N 21/47; H04N 13/393; G02B 27/221; G02B 27/2278
USPC .......................................................... 359/9
See application file for complete search history.

(56) References Cited

FOREIGN PATENT DOCUMENTS

| KR | 10-2002-0039479 A | | 5/2002 | |
|---|---|---|---|---|
| KR | 10-2014-0037430 A | | 3/2014 | |
| KR | 10-2014-0049865 A | | 4/2014 | |
| KR | 20140049865 A | * | 4/2014 | ............. G02B 27/22 |

* cited by examiner

[Fig. 1]
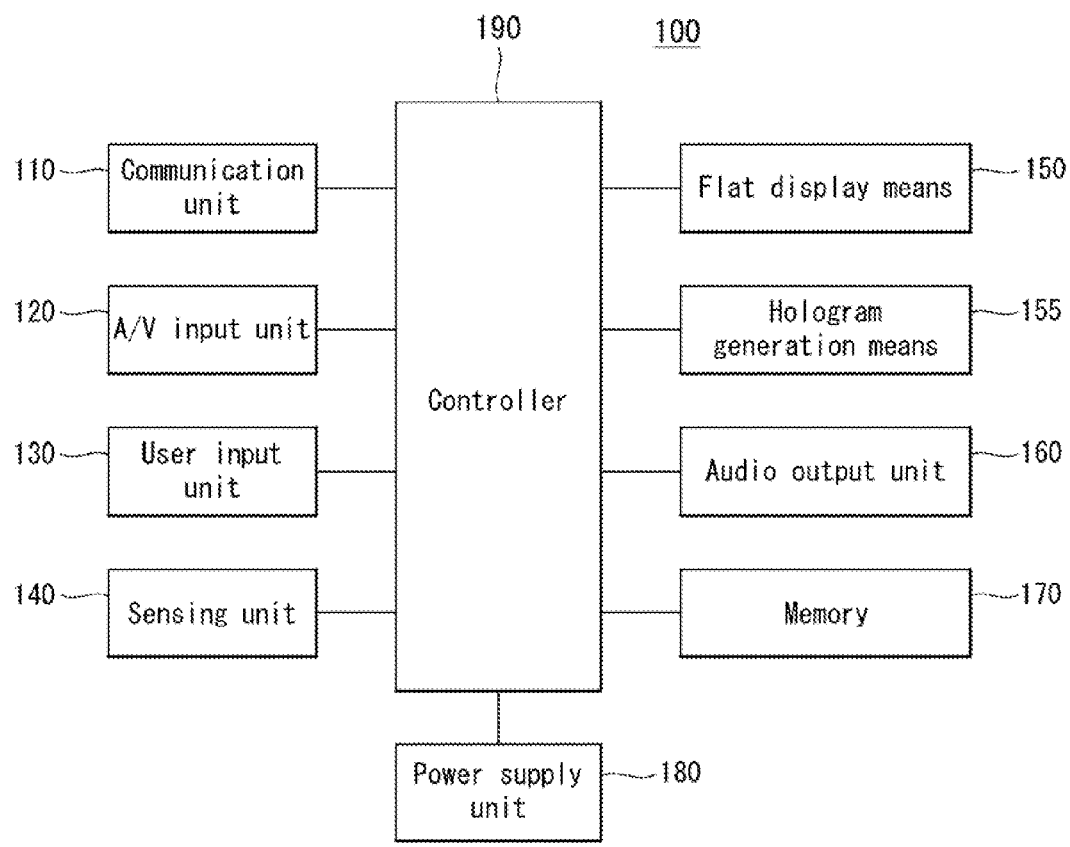

[Fig. 2]
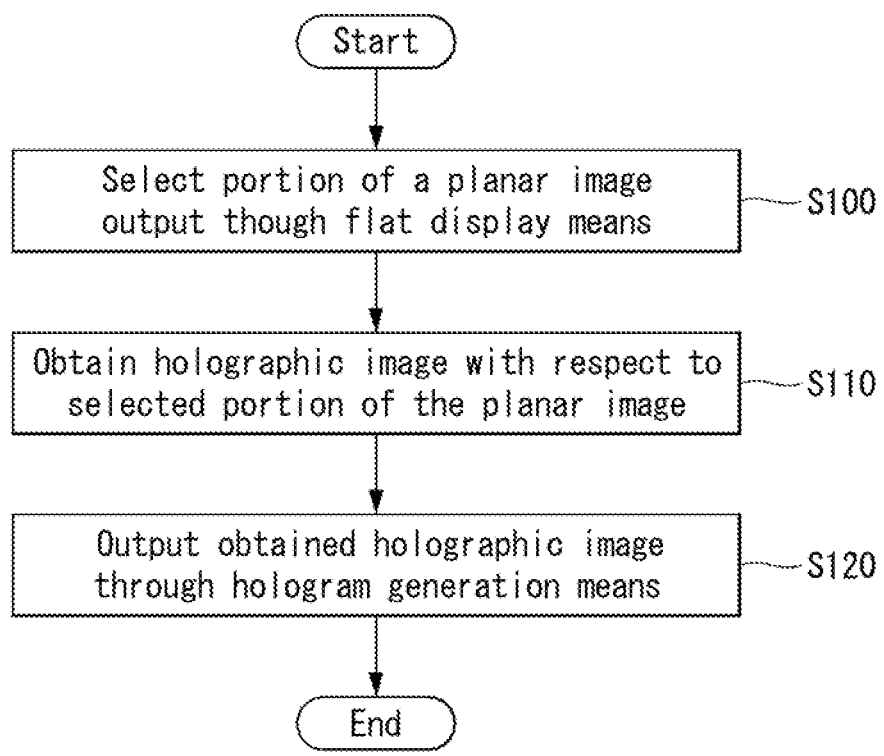

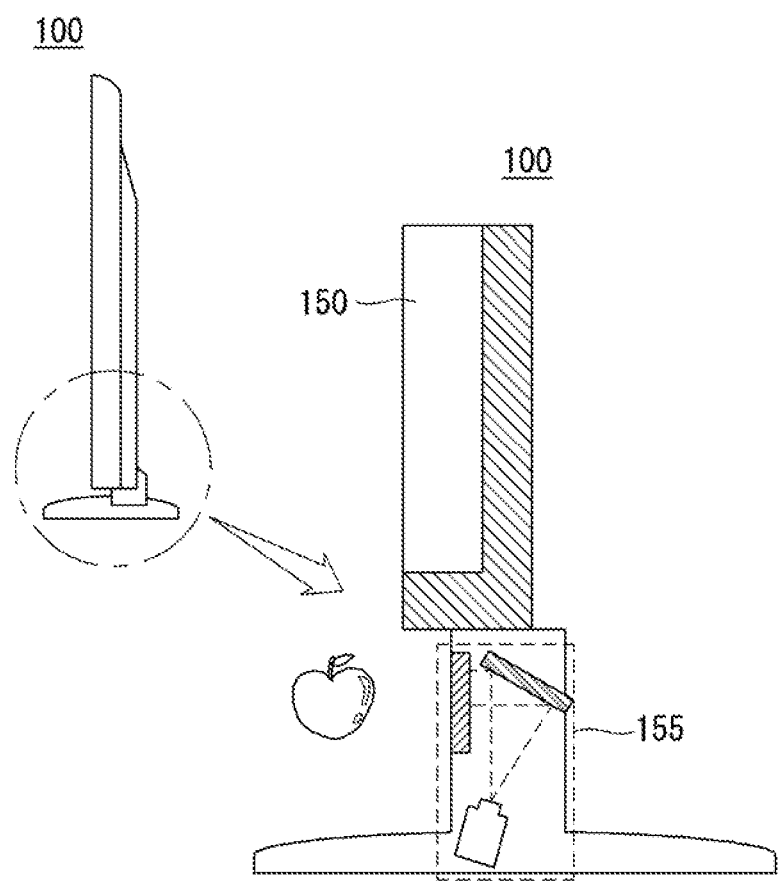
[Fig. 3]

[Fig.4]
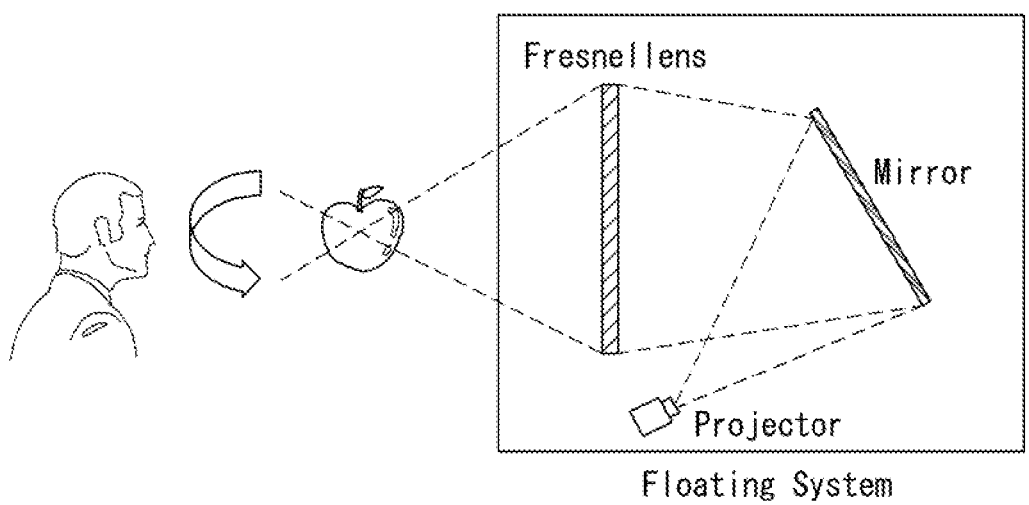

[Fig. 5]
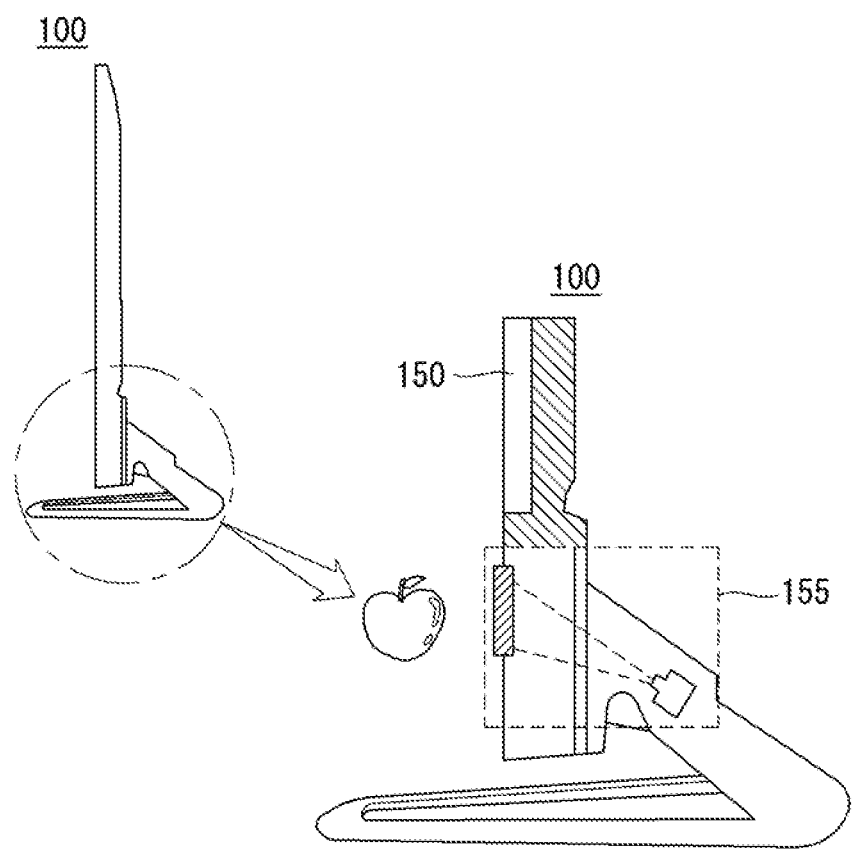

[Fig. 6]
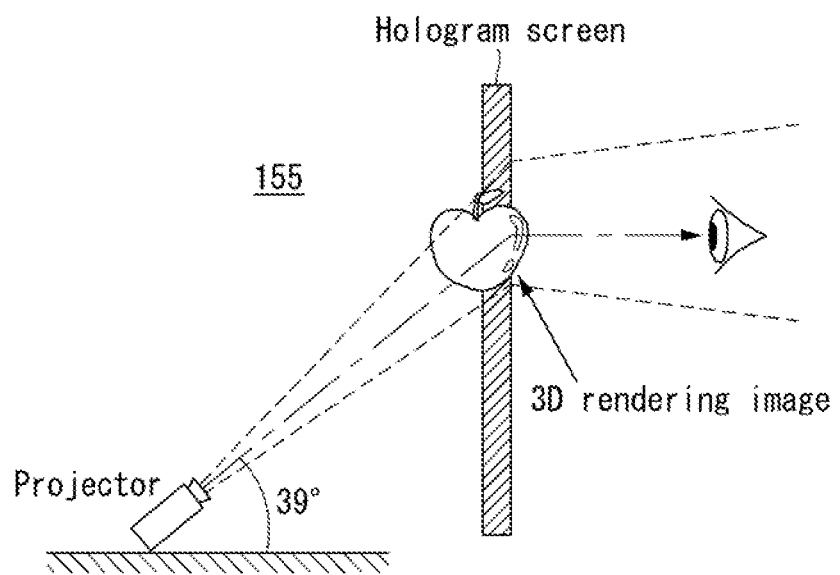

[Fig. 7]
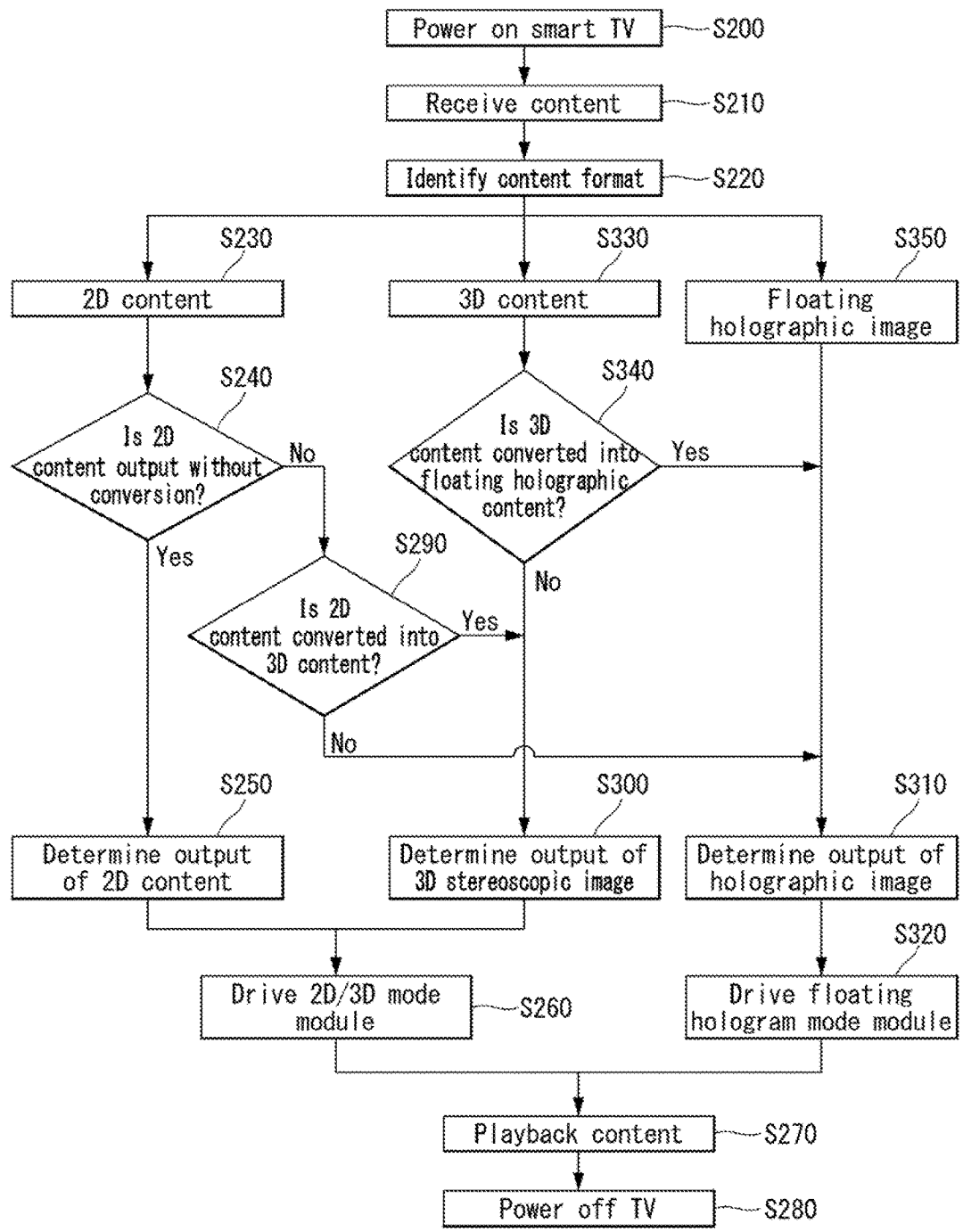

[Fig. 8]
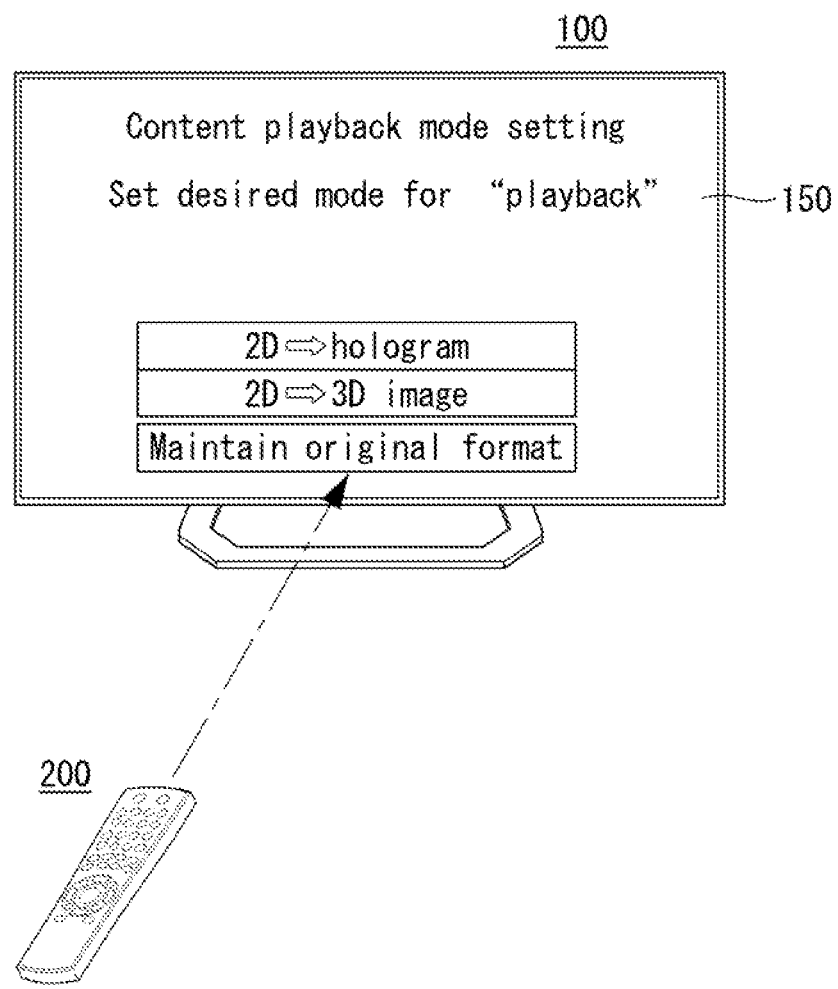

[Fig. 9]
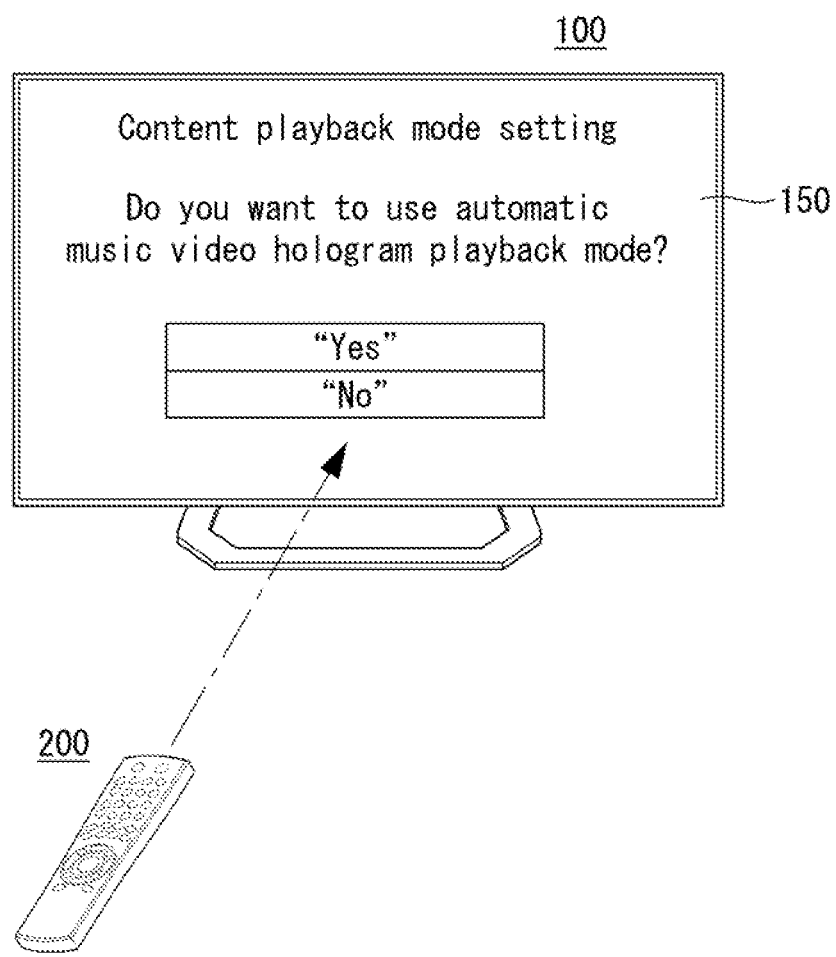

[Fig. 10]
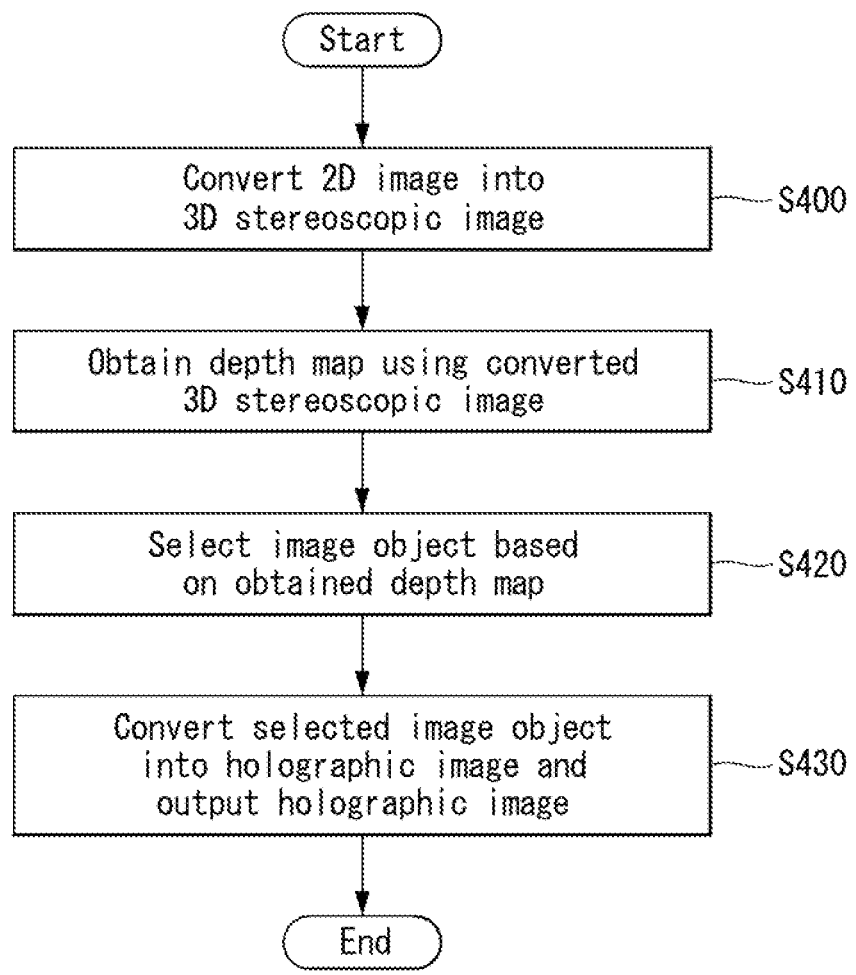

[Fig. 11]
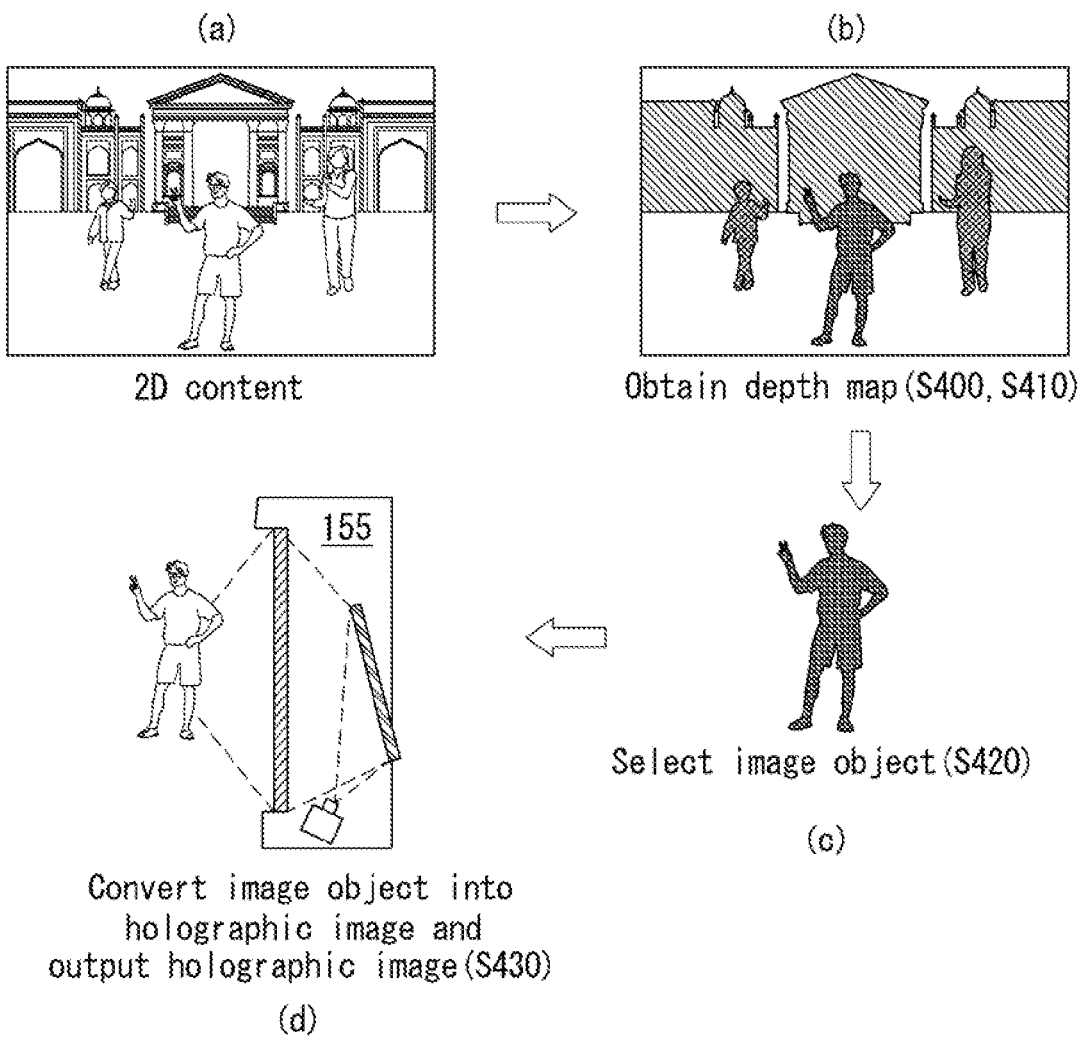

[Fig. 12]
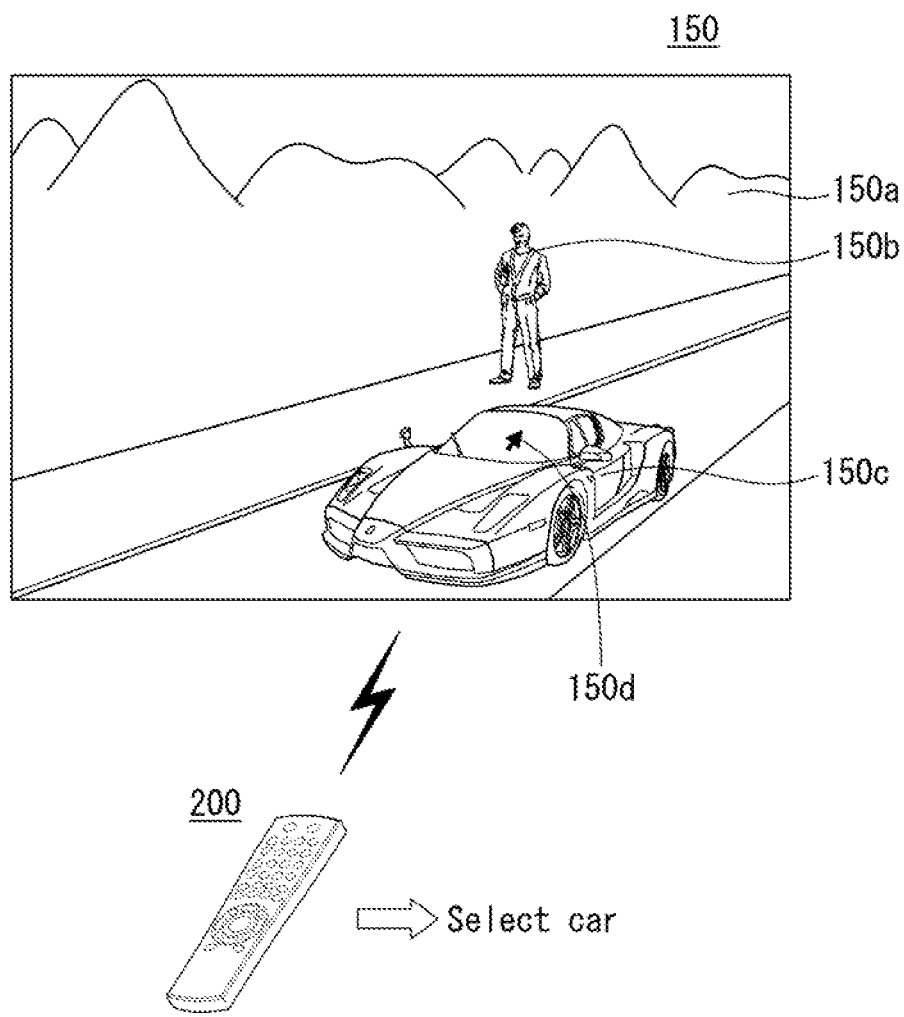

[Fig. 13]
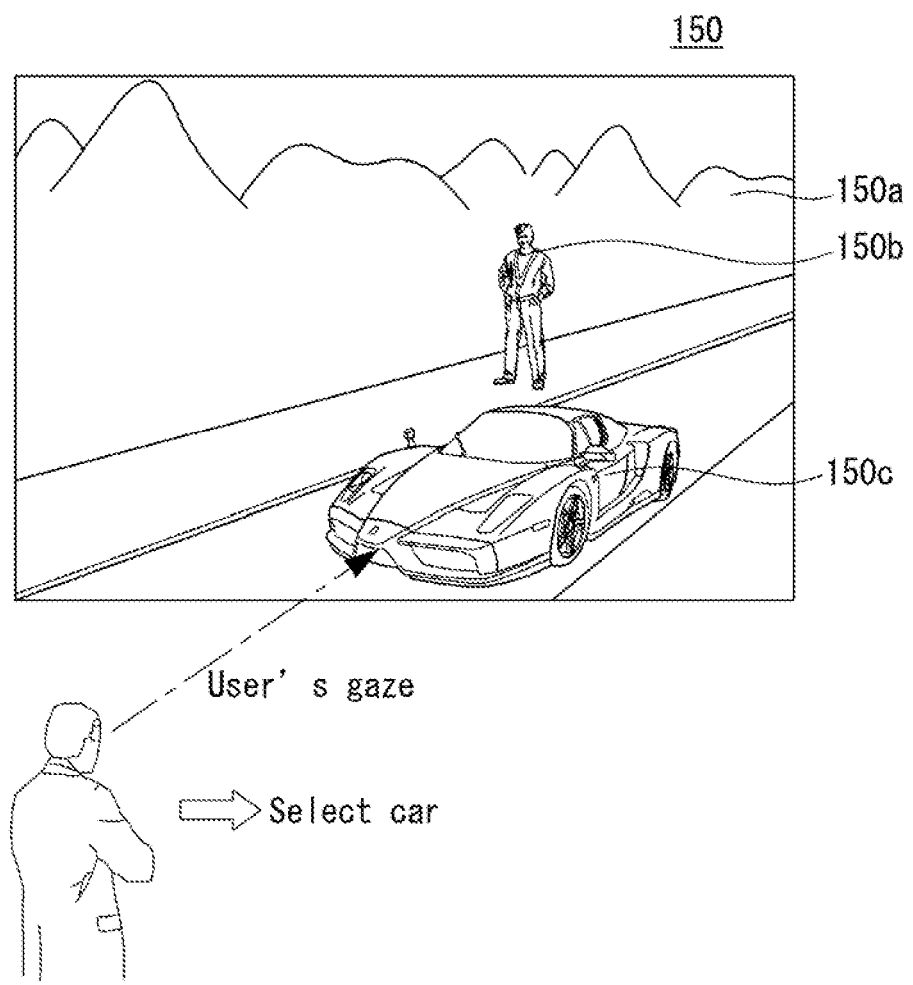

[Fig. 14]
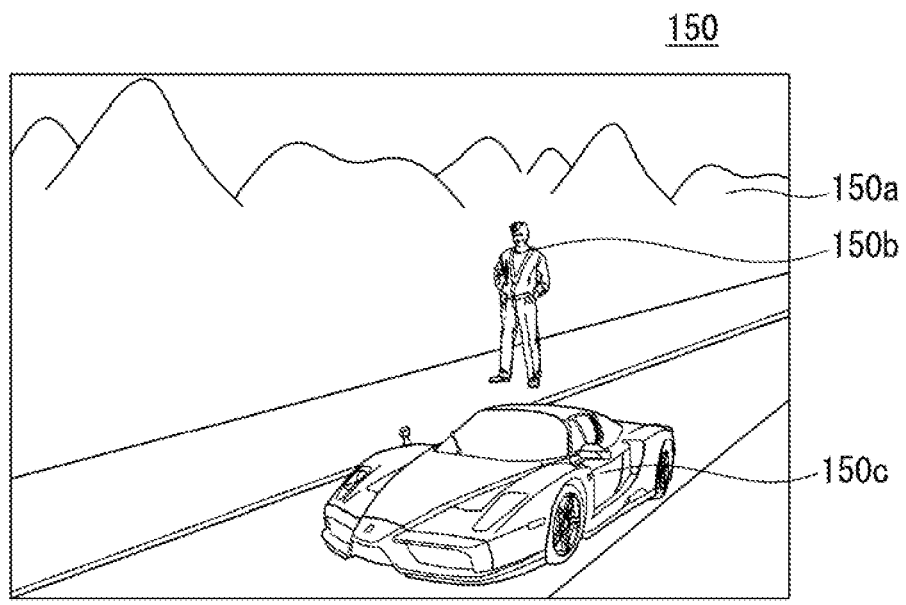
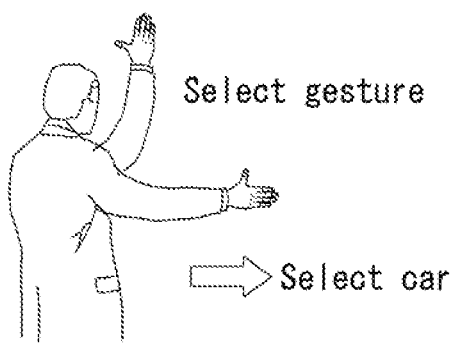
Select gesture
⇨ Select car

[Fig. 15]
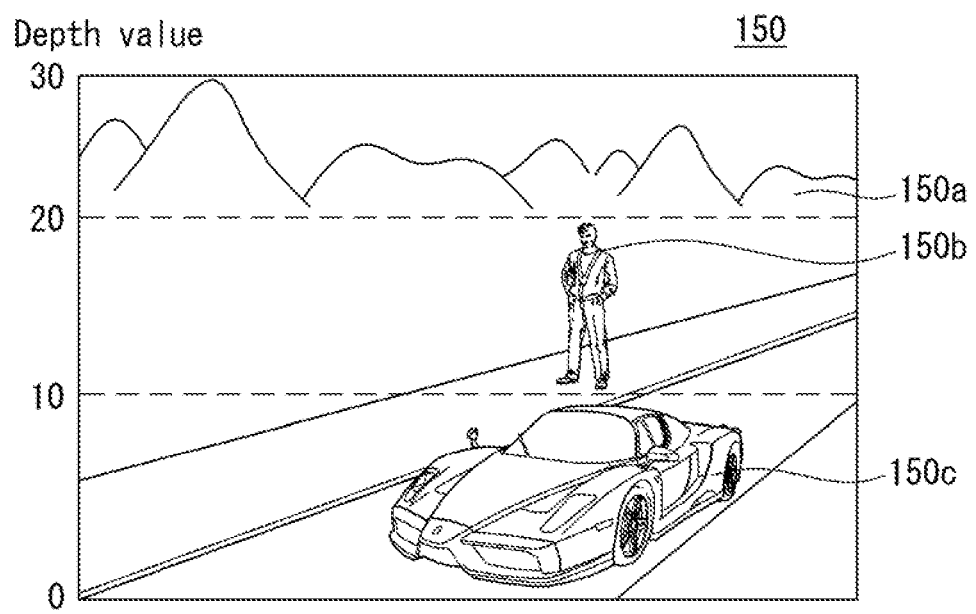

[Fig. 16]
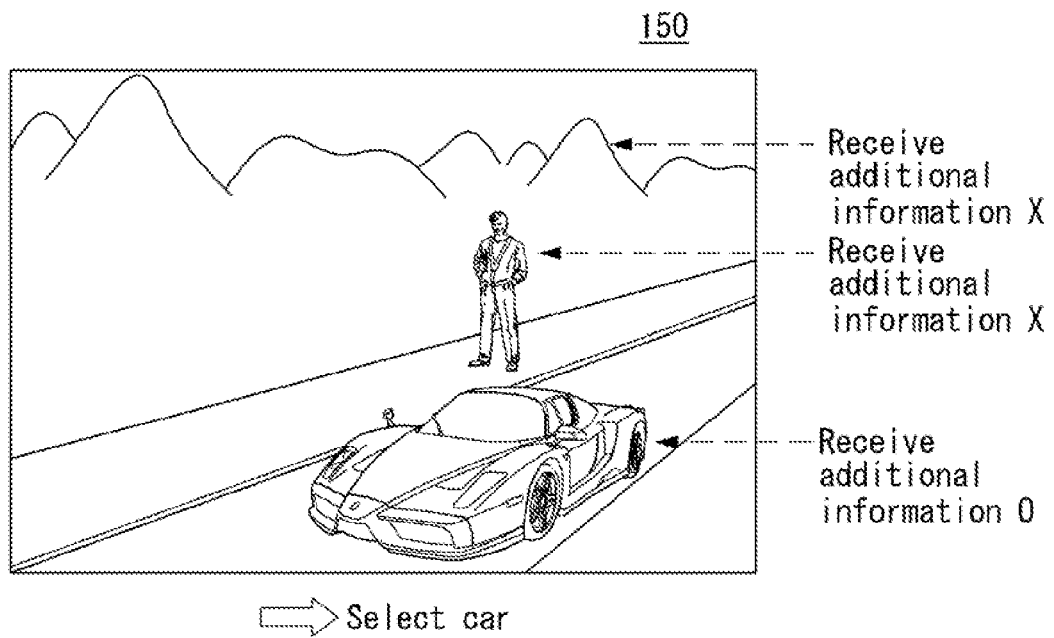

[Fig. 17]
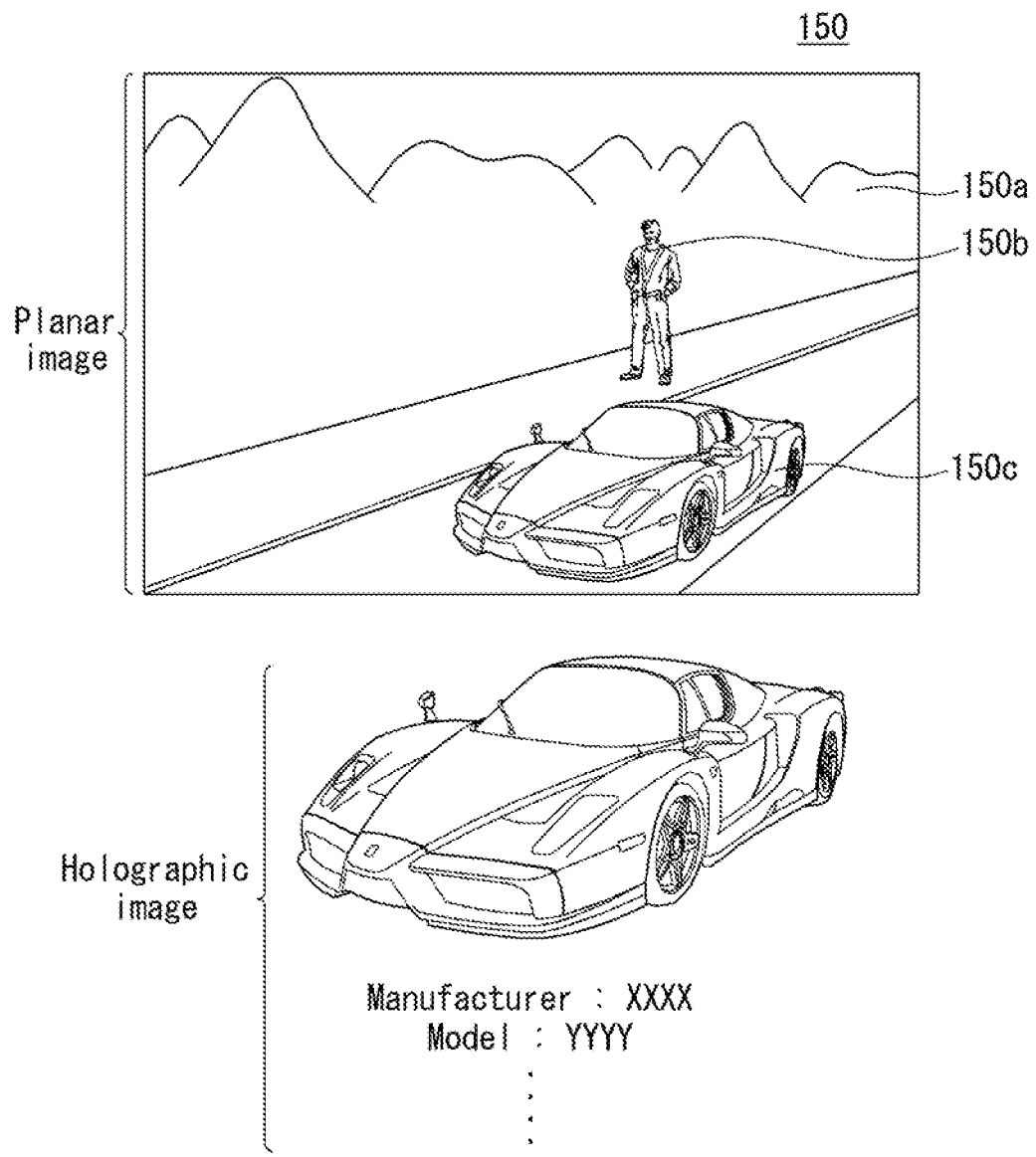

[Fig. 18]
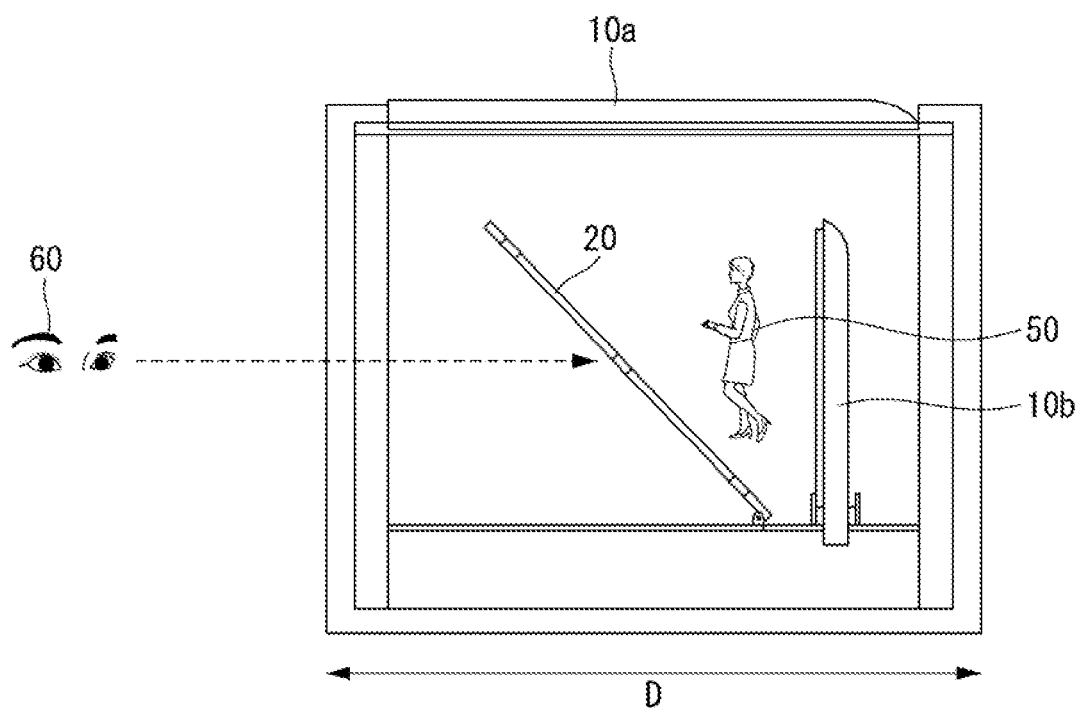

[Fig. 19]
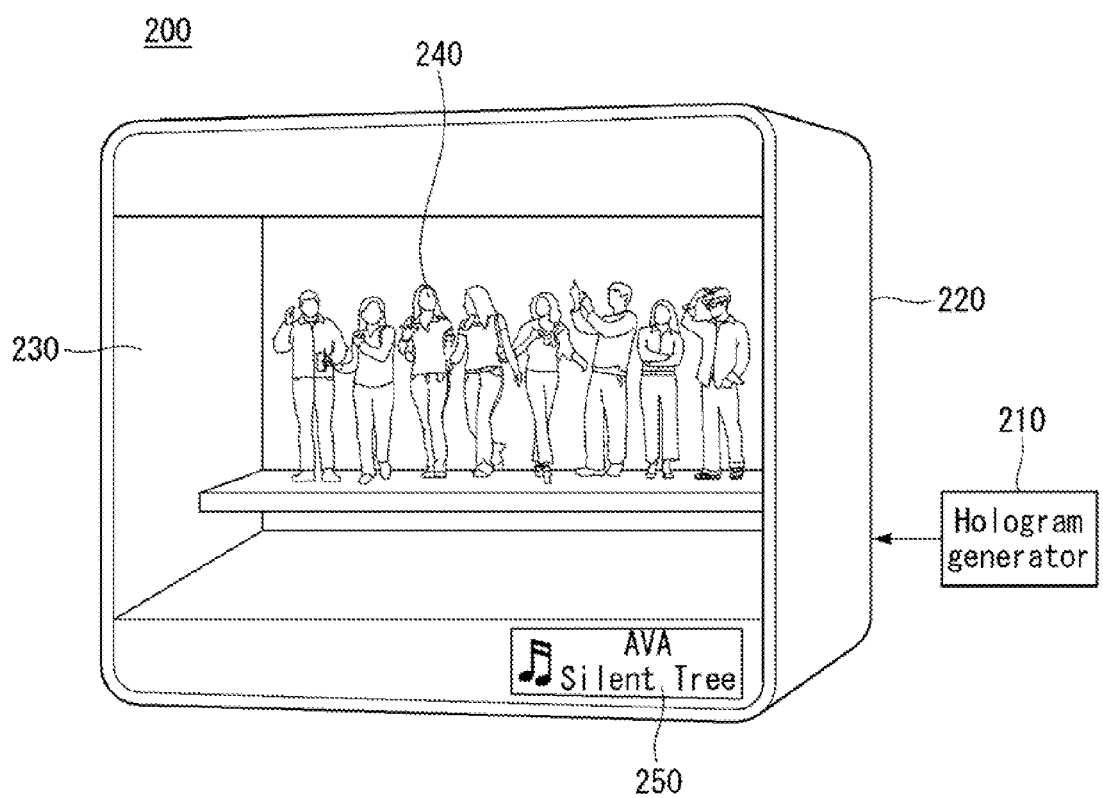

[Fig. 20]
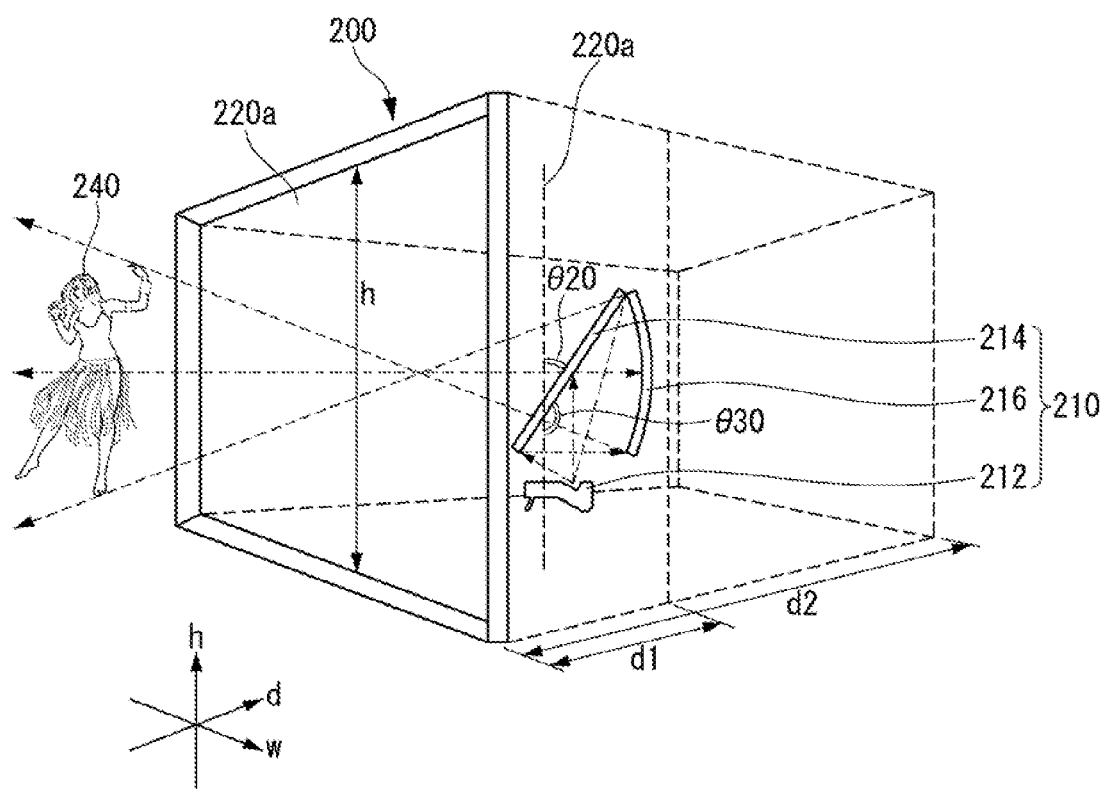

[Fig. 21]
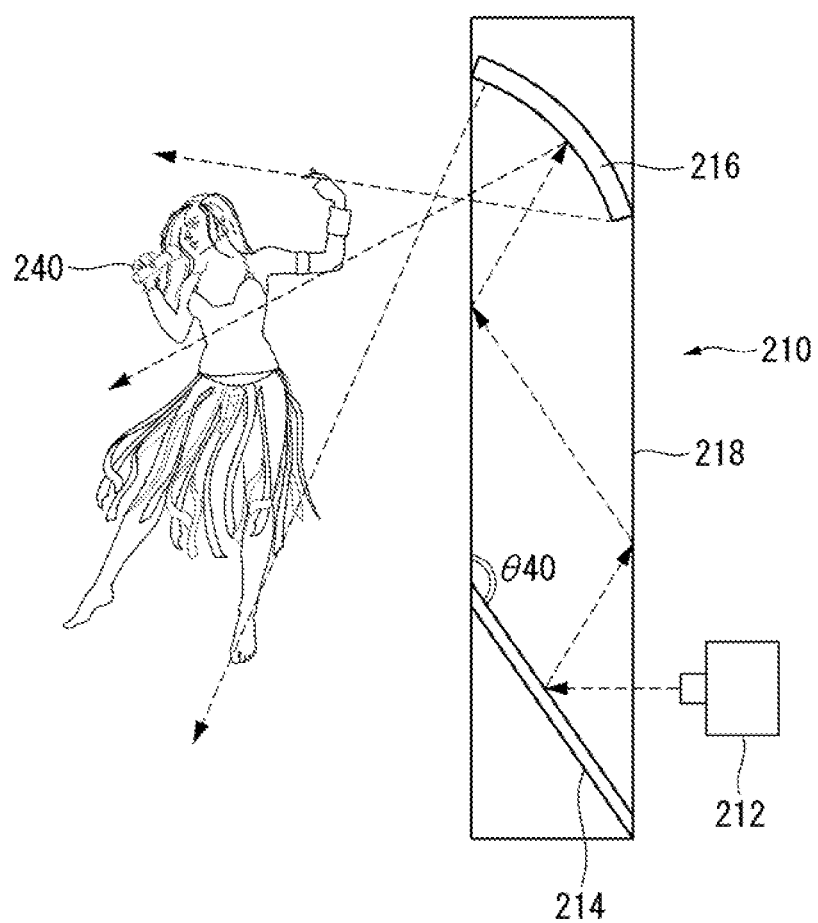

[Fig. 22]
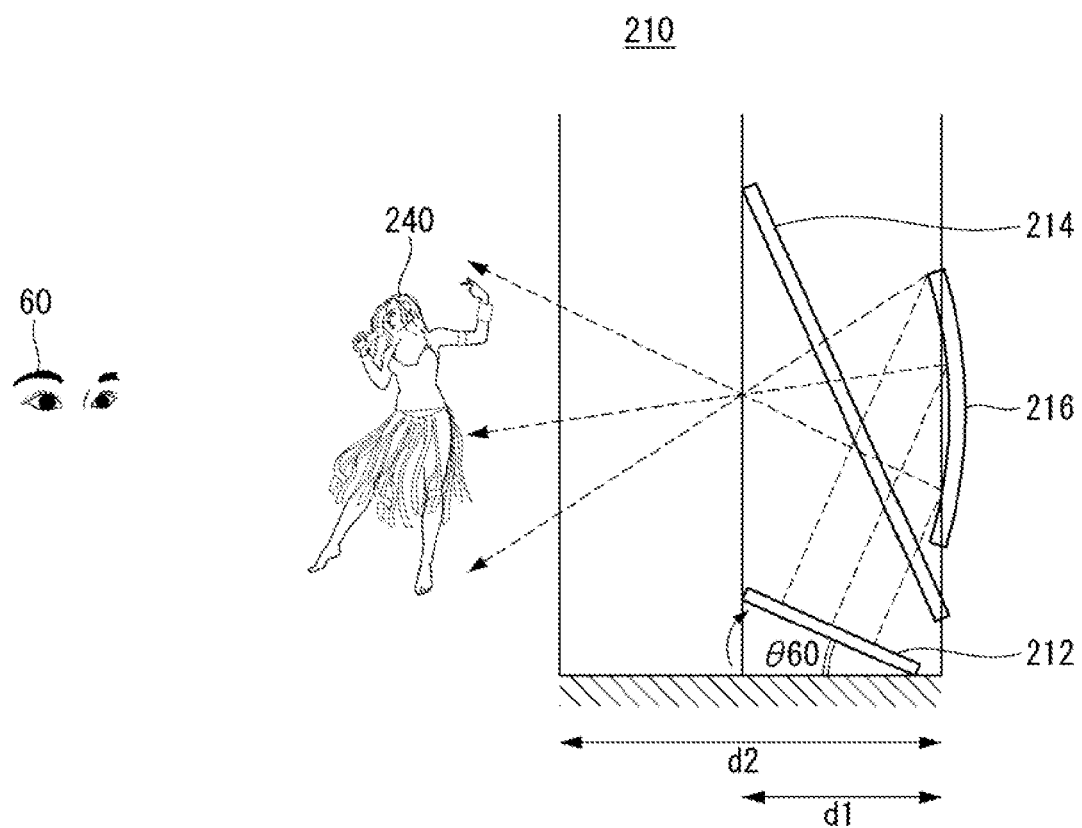

[Fig. 23]
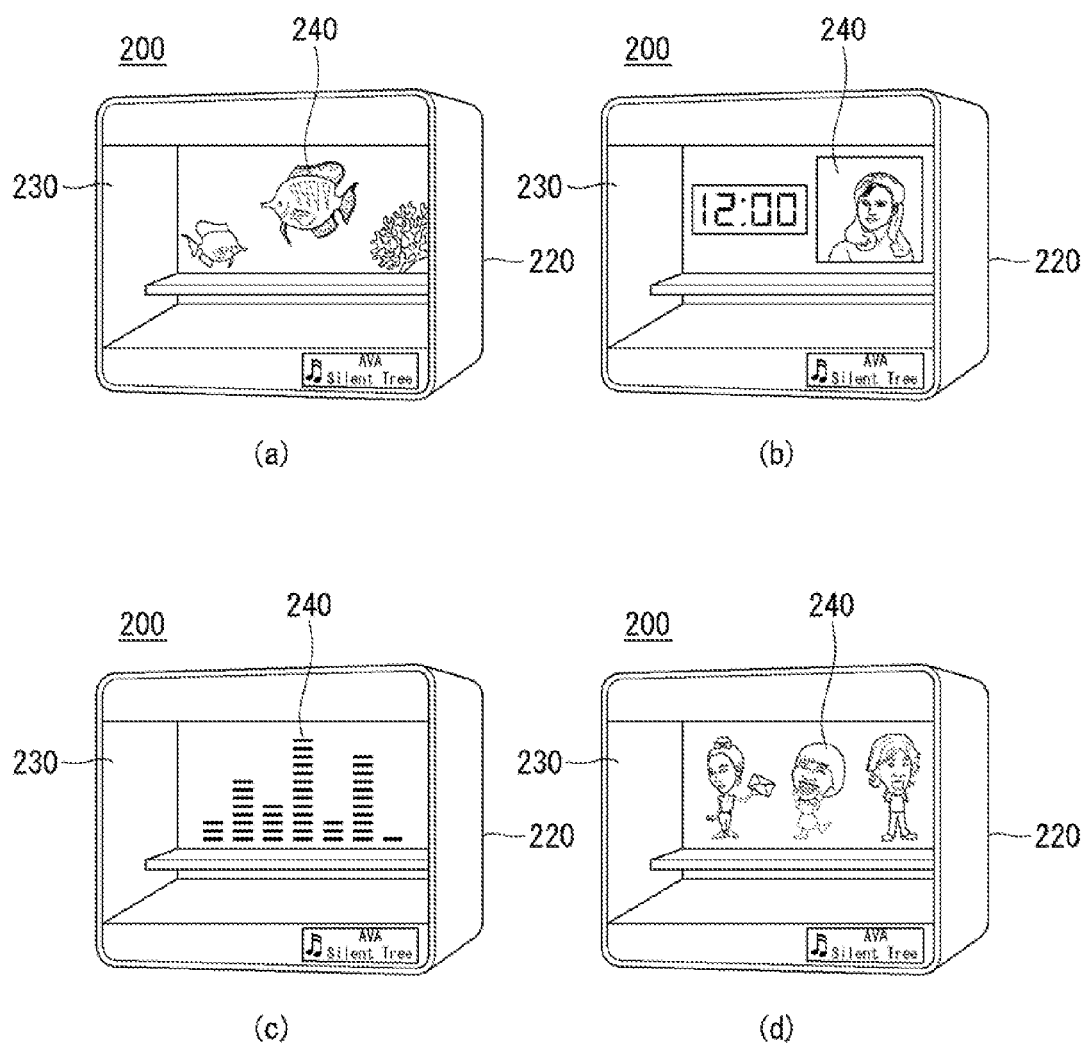

[Fig. 24]
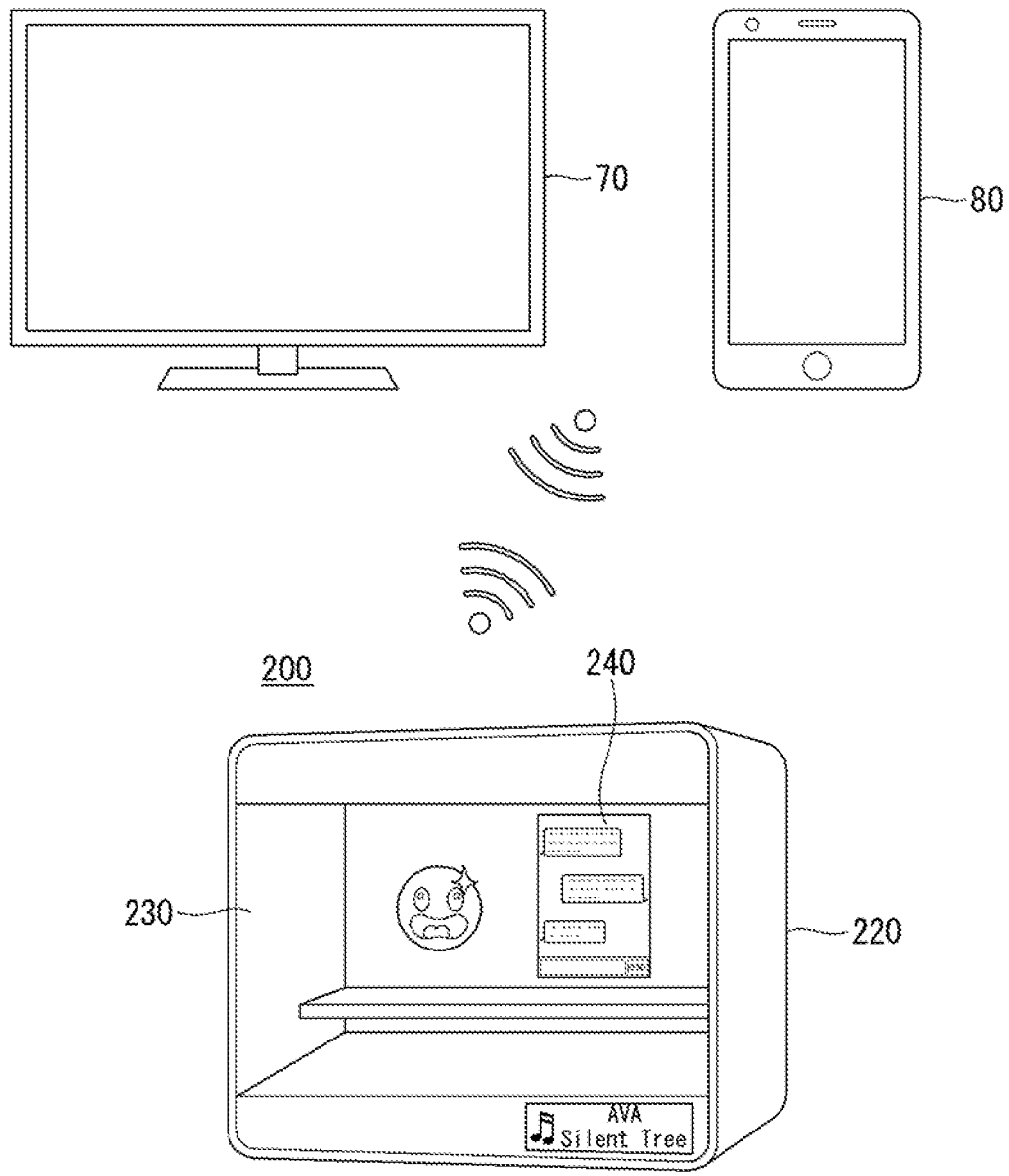

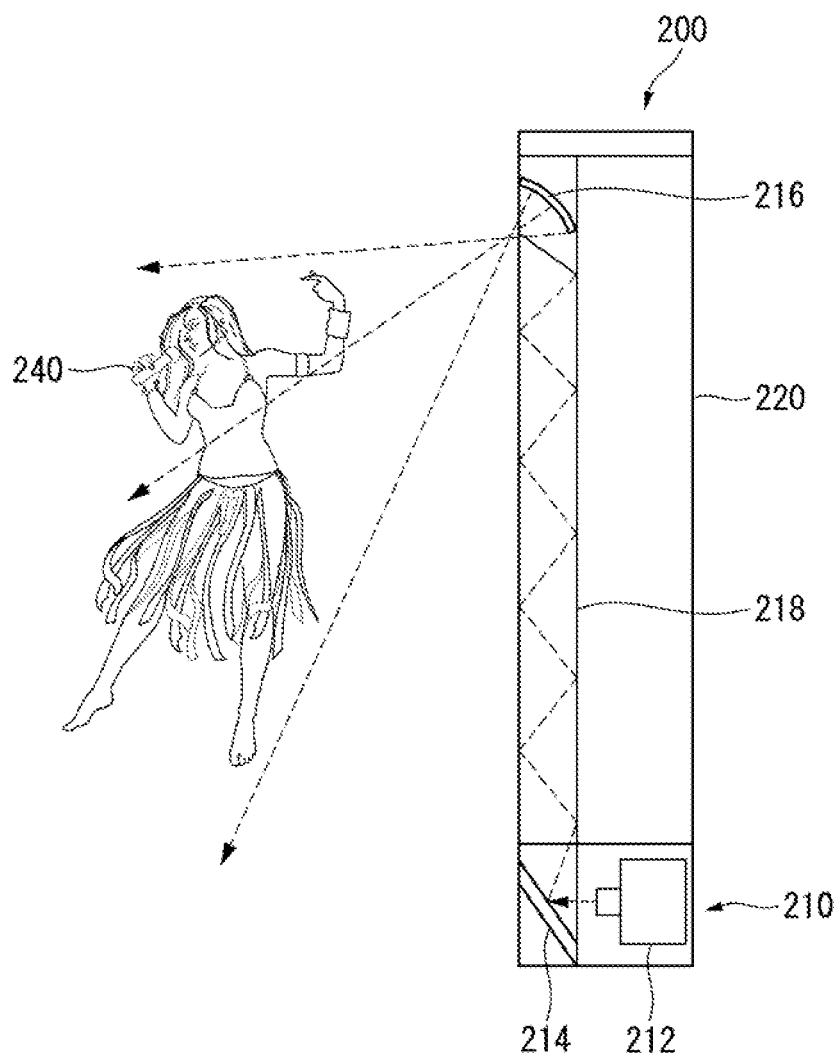
[Fig. 25]

[Fig. 26]
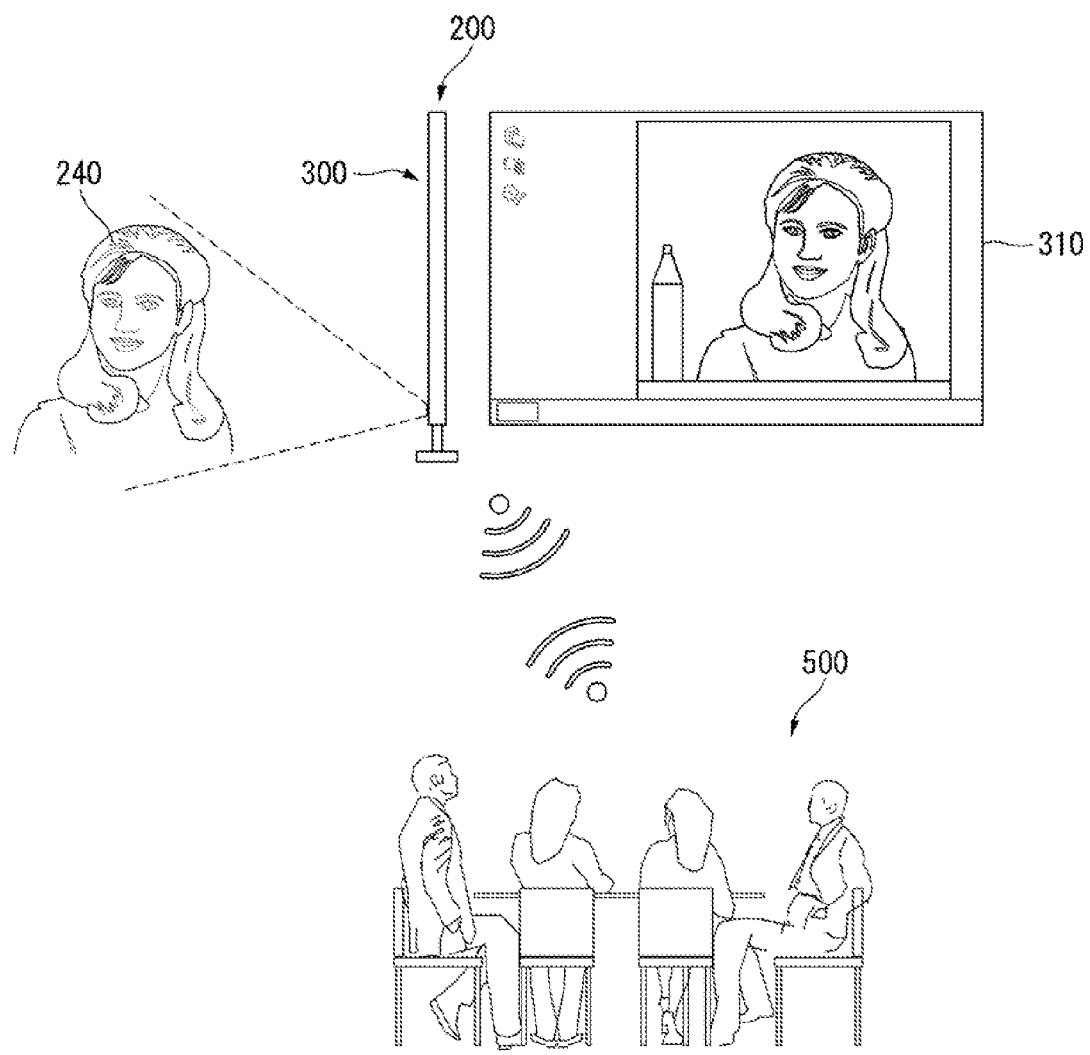

[Fig. 27]
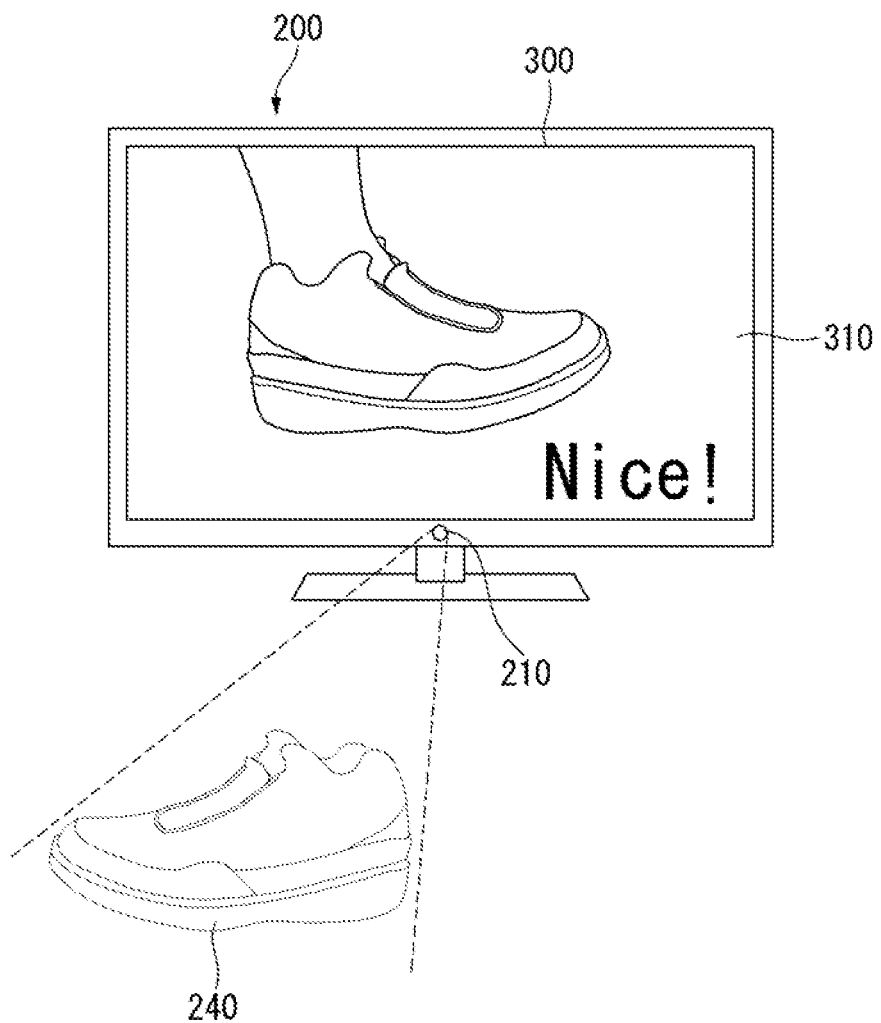

[Fig. 28]
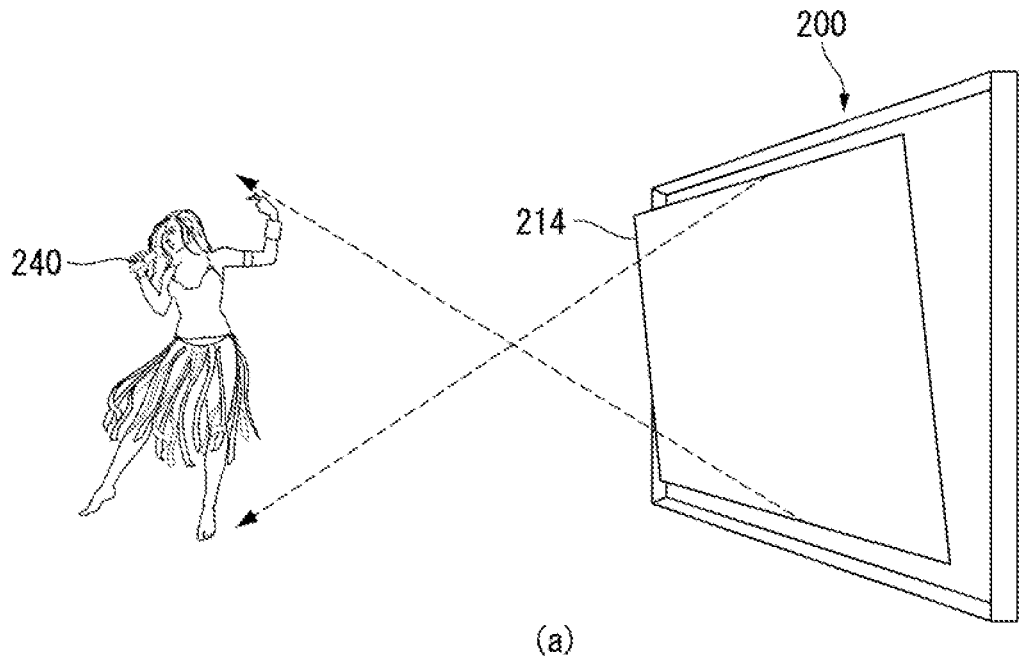
(a)
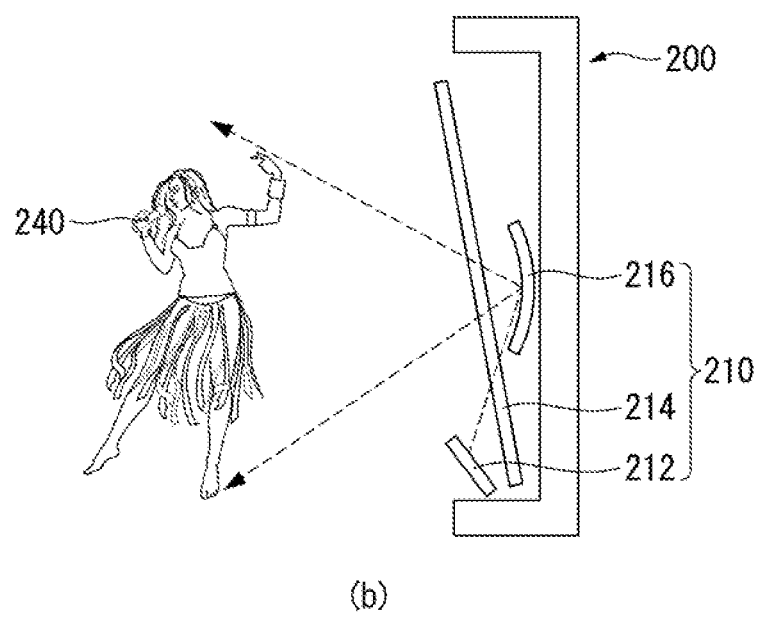
(b)

[Fig. 29]
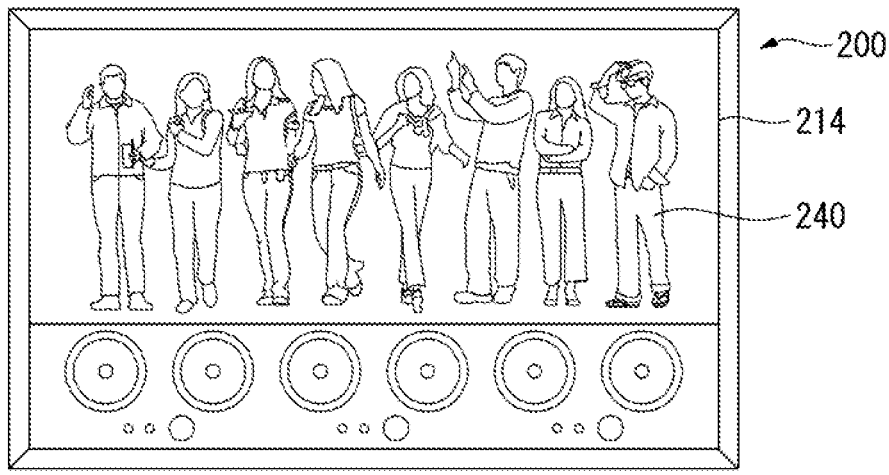
(a)
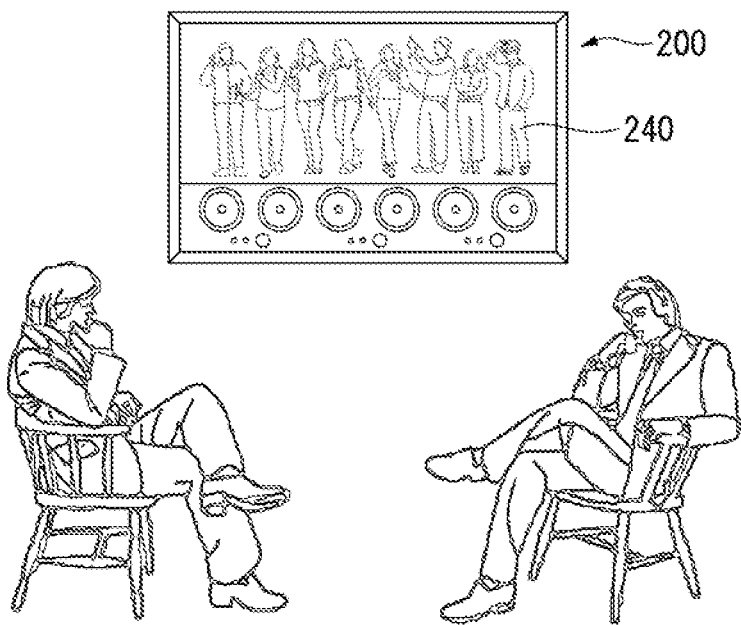
(b)

[Fig. 30]
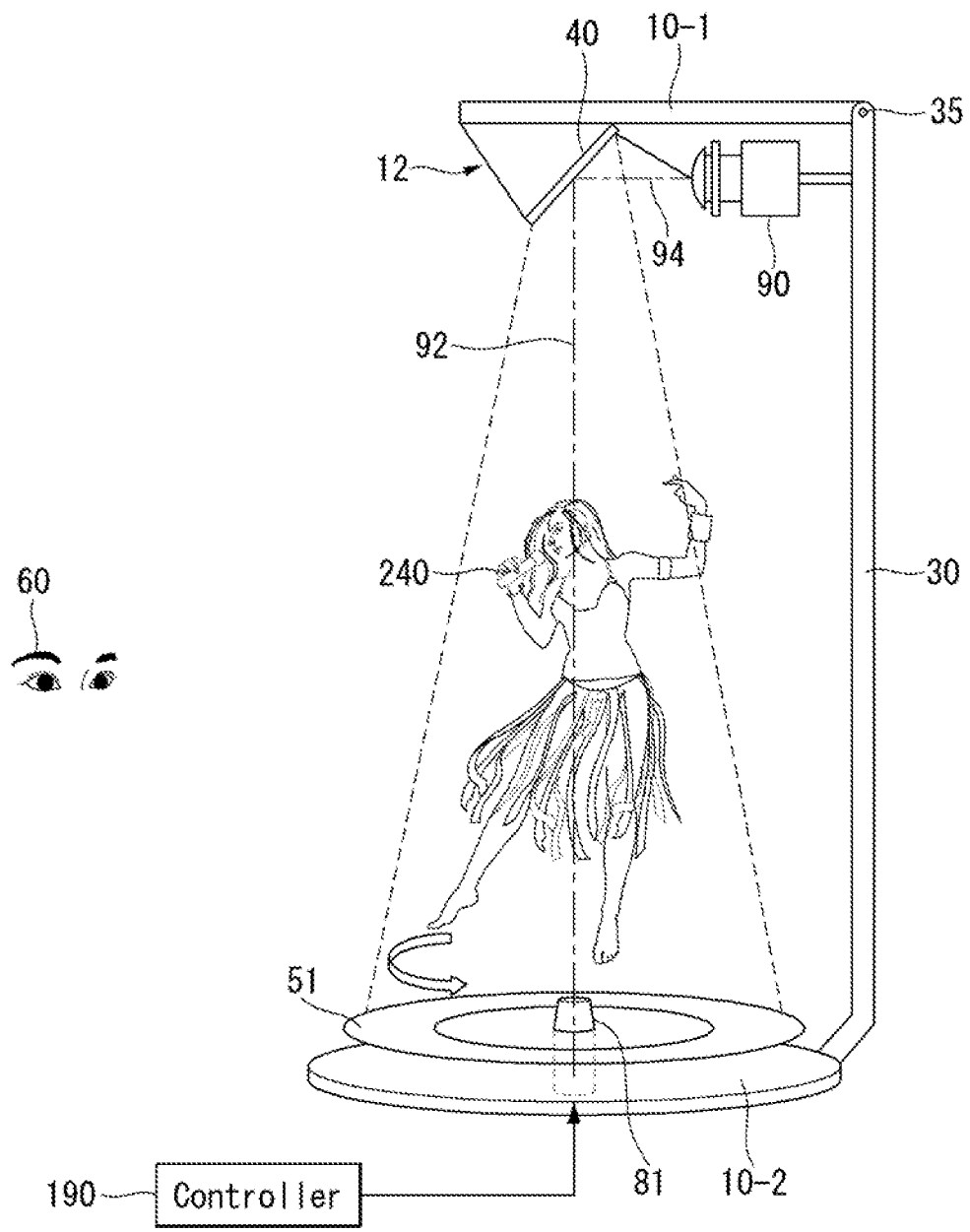

[Fig. 31]
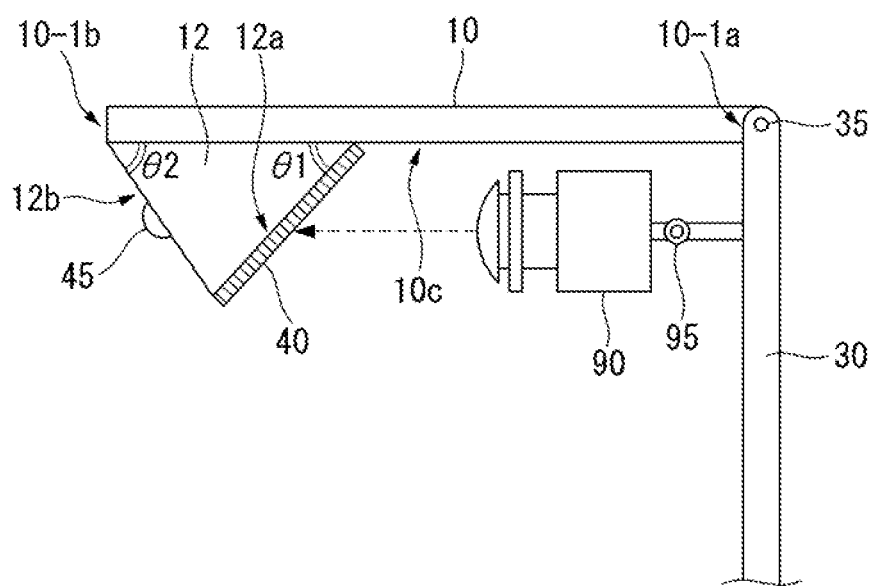

[Fig. 32]
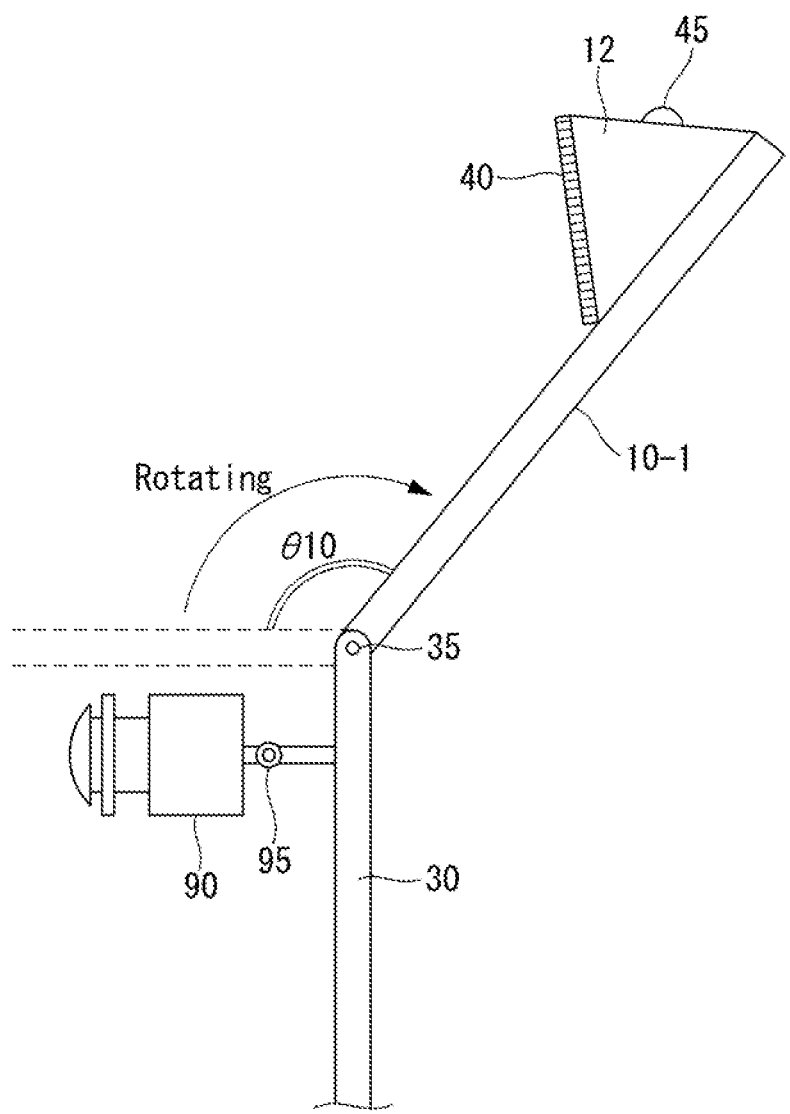

[Fig. 33]
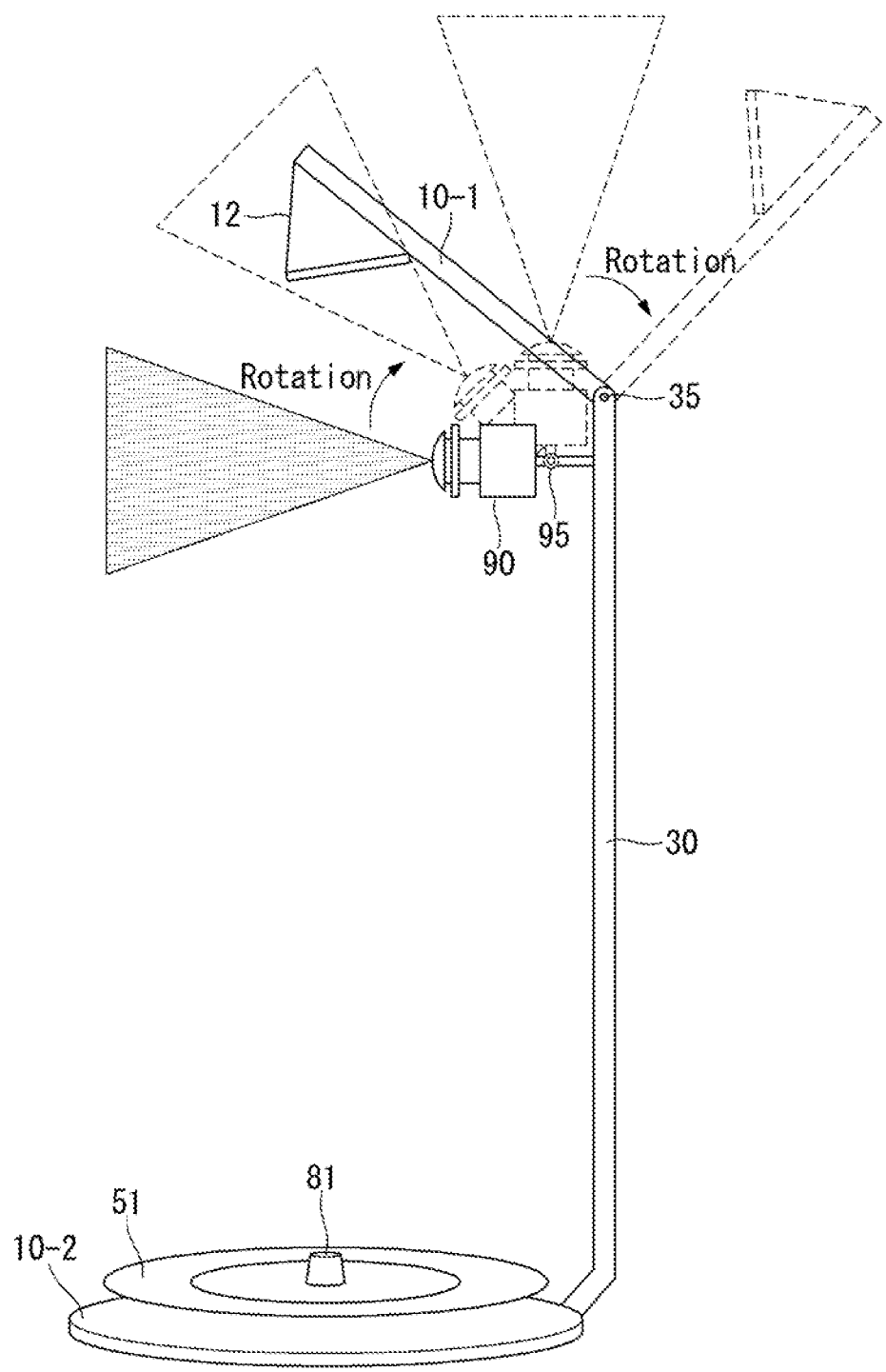

[Fig. 34]
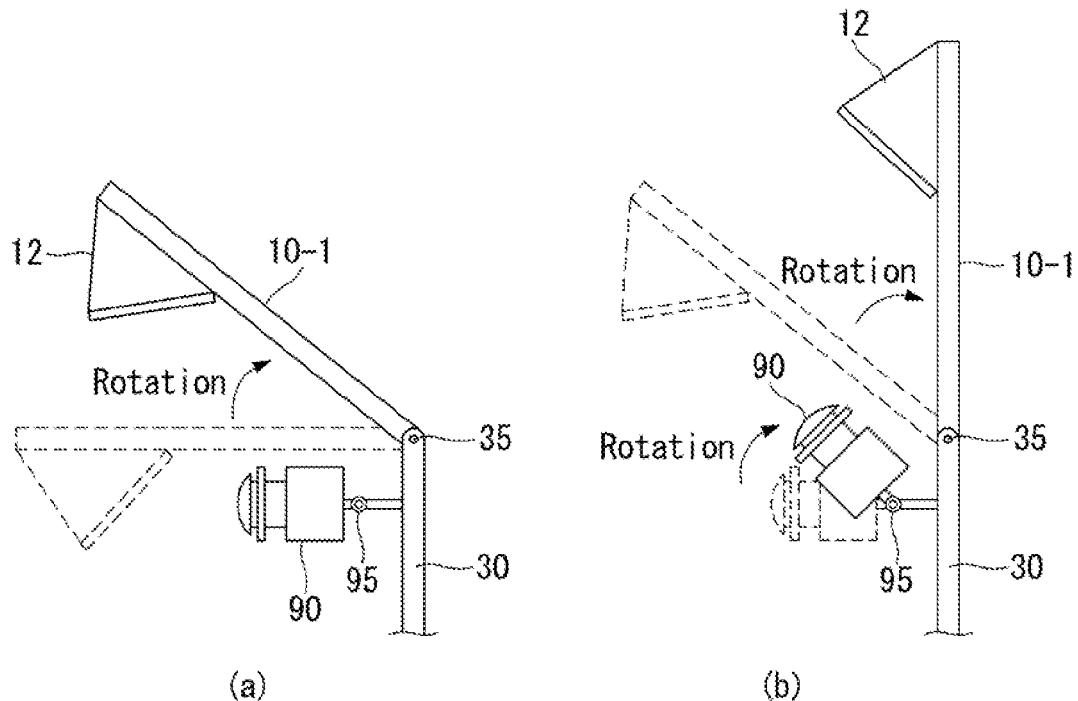
(a)  (b)
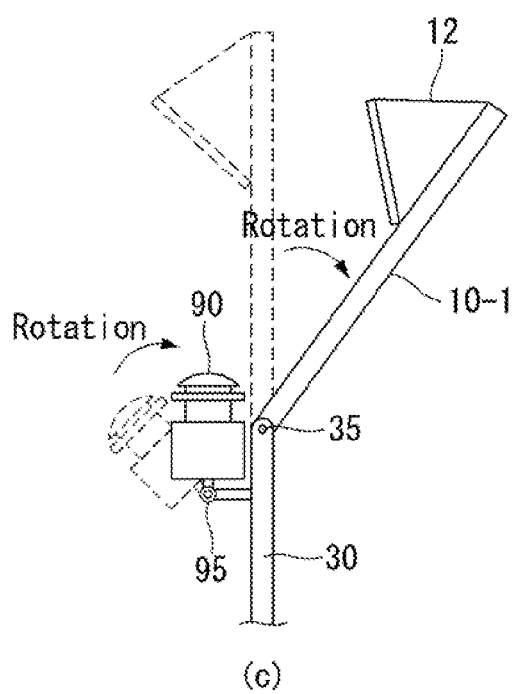
(c)

[Fig. 35]
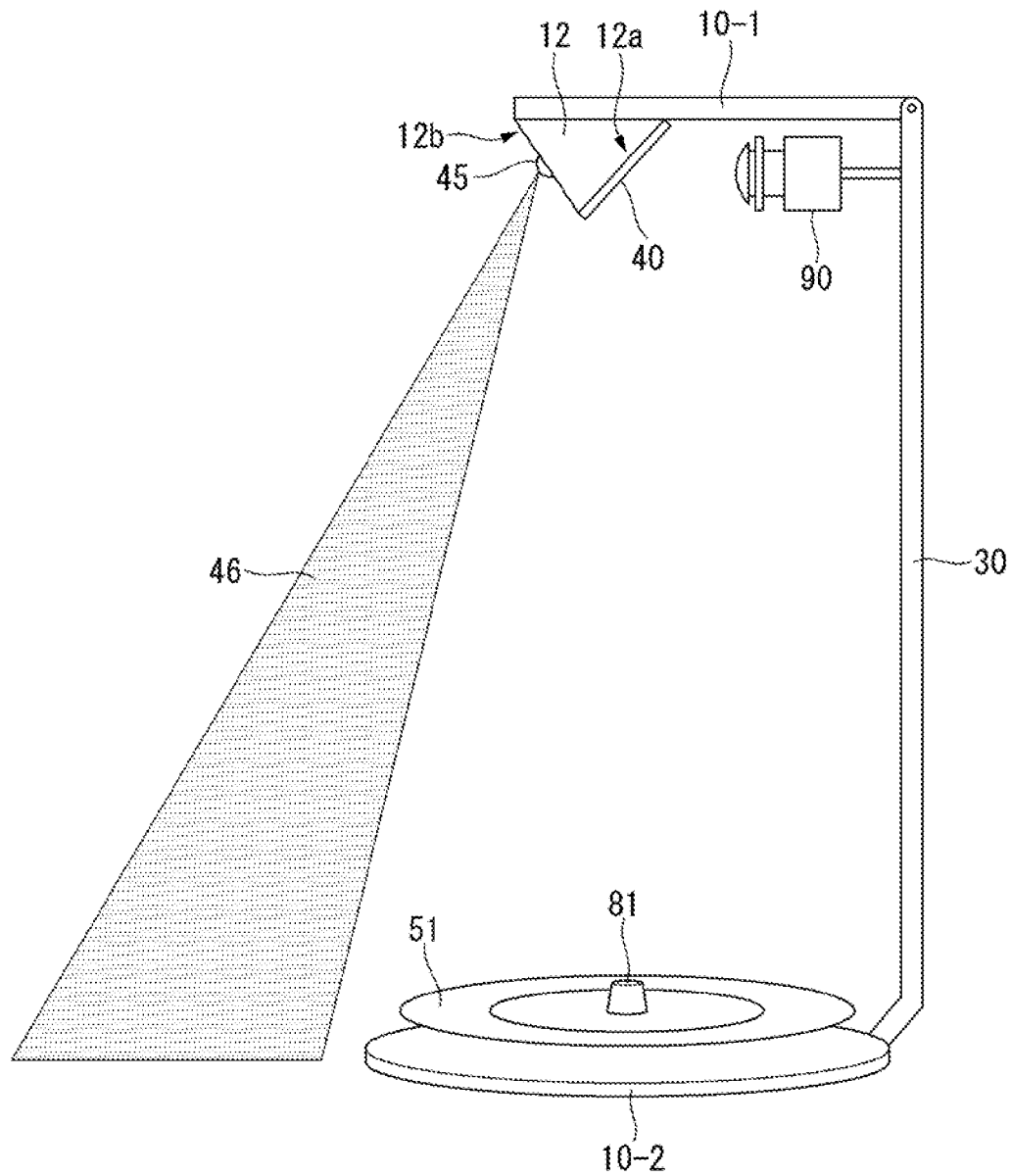

DISPLAY DEVICE AND DRIVING METHOD THEREOF

CROSS REFERENCE TO RELATED APPLICATIONS

This application is the National Phase of PCT International Application No. PCT/KR2015/005544, filed on Jun. 2, 2015, which claims priority under 35 U.S.C. 119(a) to Patent Application No. 10-2014-0075997, filed in Republic of Korea on Jun. 20, 2014, Patent Application No. 10-2014-0101500, filed in Republic of Korea on Aug. 7, 2014, Patent Application No. 10-2014-0103278, filed in Republic of Korea on Aug. 11, 2014, all of which are hereby expressly incorporated by reference into the present application.

TECHNICAL FIELD

The present invention relates to a display device and a driving method thereof and, more specifically, to a display device capable of simultaneously outputting a planar image and a holographic image and a driving method thereof.

BACKGROUND ART 3D holography is technology for realizing 3D images that can be viewed in all directions of 360 degrees and 3D stereoscopic images generated through 3D holography have advantages of providing 3D effects to enhance reality and immersion. Holography includes real 3D holography provides 3D images that can be viewed in all directions of 360 degrees and pseudo-holography that projects a 2D image onto a plane rather than providing a perfect 3D stereoscopic image. A typical example of a pseudo-hologram is a floating hologram. In addition, various types of pseudo-holography are being commercialized or studied.

SUMMARY OF THE INVENTION

An object of the present invention is to provide a display device capable of simultaneously outputting a planar image and a holographic image and a driving method thereof.

A more specific technical object of the present invention is to provide a display device capable of selectively providing at least a portion of a planar image displayed through a flat display as a holographic image and a driving method thereof.

It will be appreciated by persons skilled in the art that the objects that could be achieved with the present invention are not limited to what has been particularly described hereinabove and the above and other objects that the present invention could achieve will be more clearly understood from the following detailed description.

In an aspect of the present invention, a display device includes: a flat display means; a hologram generation means; and a controller configured to acquire a holographic image with respect to at least a portion of a planar image output through the flat display means and to output the obtained holographic image through the hologram generation means.

The controller may be configured to acquire depth information from the at least a portion of the planar image and to obtain the holographic image with respect to the at least a portion of the planar image on the basis of the acquired depth information.

The controller may be configured to select a specific image object included in the planar image and to acquire a holographic image of the selected image object on the basis of depth information of the selected image object.

The controller may be configured to select the specific image object from among image objects included in the planar image on the basis of depth information of the image objects included in the planar image.

The controller may be configured to select the specific image object from among image objects included in the planar image on the basis of a gesture of a user, a gaze of the user, operation of a remote controller by the user, or touch of the user through the flat display means including a touchscreen function.

The controller may be configured to select the specific image object from among image objects included in the planar image on the basis of additional information about the image objects included in the planar image.

The display device may further include a body having a predetermined space, wherein the hologram generation means includes: an image generation unit configured to generate the at least a portion of the planar image; a first mirror configured to reflect the generated planar image; and a second mirror configured to reflect the image reflected by the first mirror to a front space of the body to display the holographic image.

The second mirror may be a curved mirror having a concave reflective face.

The first mirror may be a semi-transmissive mirror configured to reflect and transmit the generated planar image.

The hologram generation means may include: an image generation unit configured to generate the at least a portion of the planar image; a first mirror configured to reflect the generated planar image; and a second mirror configured to reflect the image reflected by the first mirror to a front space of the flat display means to display the holographic image.

The display device may further include: an upper plate; a lower plate separated and arranged having a predetermined space from the upper plate; a connector configured to connect one side of the upper plate to one side of the lower plate; an image projector arranged at the end of the connector and configured to project the at least a portion of the planar image; a mirror arranged on the upper plate and configured to reflect the planar image to the lower plate; and a scanning screen arranged on the lower plate and configured to project the image reflected from the mirror to the space between the upper plate and the lower plate to display the holographic image, wherein the scanning screen rotates about a rotation axis perpendicular to the surface of the lower plate.

The controller may be configured to activate rotation of the scanning screen to output the holographic image upon determining that the upper plate and the lower plate are parallel with each other.

The controller may be configured to deactivate rotation of the scanning screen to output the planar image upon determining that the upper plate and the lower plate are not parallel with each other.

The display device may further include: a protrusion formed at one side of the upper plate and projected downward from the upper plate; and a light source provided on the protrusion and maintaining a predetermined angle to the downward direction, wherein the controller is configured to activate the light source upon determining that an illumination request signal is received.

In another aspect of the present invention, a method of driving a display device includes: selecting at least a portion of a planar image output through a flat display means; acquiring a holographic image with respect to the selected portion of the planar image; and outputting the acquired holographic image through a hologram generation means.

Advantageous Effects

The display device according to the present invention can simultaneously output a planar image and a holographic image.

In addition, the display device according to the present invention can selectively provide at least part of a planar image displayed through a planar display as a holographic image

BRIEF DESCRIPTION OF THE DRAWINGS

FIG. 1 is a block diagram of a display device according to an embodiment of the present invention.

FIG. 2 is a flowchart illustrating an example of a method of driving the display device according to an embodiment of the present invention.

FIGS. 3 and 4 illustrate an example of outputting a holographic image corresponding to part of a planar image output through a planar display means, through a hologram generator in the display device according to an embodiment of the present invention.

FIGS. 5 and 6 illustrate another example of outputting a holographic image corresponding to part of a planar image output through a planar display means, through the hologram generator in the display device according to an embodiment of the present invention.

FIG. 7 is a flowchart illustrating another example of the method of driving the display device according to an embodiment of the present invention.

FIGS. 8 and 9 illustrate an example of setting a video output mode in the display device according to an embodiment of the present invention.

FIG. 10 is a flowchart illustrating an example of a method of driving the display device according to an embodiment of the present invention which converts an image object included in a 2D image into a holographic image and outputs the holographic image.

FIG. 11 illustrates an example in which the method of driving the display device according to an embodiment of the present invention, shown in FIG. 10, is performed.

FIGS. 12 to 16 illustrate an example of selecting an image object to be converted into a holographic image and output from image objects included in a 2D image in the display device according to an embodiment of the present invention.

FIG. 17 illustrates an example of converting the object selected from the 2D image into a holographic image and outputting the holographic image in the display device according to an embodiment of the present invention.

FIG. 18 illustrates a general floating hologram display device.

FIG. 19 illustrates a display device according to another embodiment of the present invention.

FIGS. 20 to 22 illustrate a hologram generator shown in FIG. 19.

FIG. 23 illustrates examples of holographic images displayed through the display device according to another embodiment of the present invention.

FIG. 24 illustrates an example of a holographic image displayed through a display device associated with other devices.

FIG. 25 is a cross-sectional view illustrating a display device to which the hologram generator shown in FIG. 21 is applied.

FIGS. 26 and 27 illustrate a hologram display device according to another embodiment of the present invention.

FIG. 28 illustrates a display device to which the hologram generator shown in FIG. 22 is applied.

FIG. 29 illustrates a frame type hologram display device of FIG. 28.

FIG. 30 illustrates a display device according to another embodiment of the present invention.

FIG. 31 illustrates an upper plate shown in FIG. 30 in detail.

FIG. 32 illustrates rotation of the upper plate.

FIG. 33 illustrates a display device in a normal image display mode.

FIG. 34 illustrates a rotational relation between the upper plate and an image projector.

FIG. 35 illustrates a display device in a lighting mode.

DETAILED DESCRIPTION OF THE EMBODIMENTS

The aforementioned objects, features, and advantages of the present invention will become more apparent through the following detailed description with respect to the accompanying drawings. Hereinafter, the embodiments of the present invention will be described with reference to the accompanying drawings, in which like numbers refer to like elements throughout the specification.

Hereinafter, an image output device related to the present invention will be described in detail with reference to the accompanying drawings. In the following description, usage of suffixes such as 'module', 'part', or 'unit' used for referring to elements is given merely to facilitate explanation of the present invention, without having any significant meaning by itself.

FIG. 1 is a block diagram of a display device according to an embodiment of the present invention. An image output device described in the specification may include a TV receiver, a monitor, a signage device and the like. However, the scope of the present invention is not limited thereto.

Referring to FIG. 1, the display device 100 includes a communication unit 110, an audio/video (AN) input unit 120, a user input unit 130, a sensing unit 140, a flat display means 150, a hologram generation means 155, an audio output unit 160, a memory 170, a power supply unit 180 and a controller 190. The components illustrated in FIG. 1 are not a requirement, and the display device 100 may have more or less components. Hereinafter, each of the components will be described.

The communication unit 110 may include one or more modules that enable wired/wireless communication between the display device 100 and a communication network. For example, the communication unit 110 can include a broadcast reception module, a mobile communication module, a wireless Internet module and a short-range communication module. The communication unit 110 can receive broadcast signals through the communication network.

The A/V input unit 120 is used to receive an audio signal or a video signal and may include a camera, a microphone and the like. The camera processes an image frame of a still image, a video, or the like, obtained by an image sensor in a video call mode or an image capture mode. The microphone receives an external audio signal and processes the external audio signal into electrical voice data.

The user input unit 130 generates input data for controlling an operation of the display device 100 by a user. The user input unit 130 may include a keypad, a dome switch, a touch pad (resistive/capacitive), a jog wheel, a jog switch, and the like.

The sensing unit 140 may sense the current state of the display device 100 or sense a state of a user, and may sense a state of the surroundings of the display device 100. Data sensed by the sensing unit 140 may be used as a base for controlling an operation of the display device 100.

The flat display means 150 outputs information processed in the display device 100 as images. Images displayed through the flat display means 150 may be 2D images or 3D stereoscopic images. The flat display means 150 may be formed as a liquid crystal display (LCD), a thin film transistor-LCD (TFT-LCD), an organic light emitting diode (OLED) display, or a flexible display.

The hologram generation means 155 may output a holographic image. Here, the holographic image may be a real 3D holographic image that can be viewed in all directions of 360 degrees or a floating pseudo holographic image.

The audio output unit 160 outputs an audio signal related to a function performed in the display device 100. The audio output unit 160 may include a receiver, a speaker, a buzzer, and the like. Also, the audio output unit 160 may output a sound through an earphone jack.

The memory 170 may store a program for an operation of the controller 190 and may temporarily or permanently store input/output data. The memory 160 may temporarily or permanently store video data output through the flat display means 150 and the hologram generation means 155 and audio data corresponding thereto.

The memory 170 may include at least one storage medium of a flash memory type, a hard disk type, a multimedia card micro type, a card type memory (e.g., SD, DX memory, etc.), random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The display device 100 may operate in association with a web storage which performs the storage function of the memory 170 on the Internet.

The controller 190 typically controls overall operation of the display device 100. For example, the controller 190 can control the flat display means 150 to display a 2D image and, simultaneously, control the hologram generation means 155 to display a holographic image. The holographic image displayed through the hologram generation means 155 may be obtained on the basis of the 2D image. Such image output control of the controller 190 will be described below in detail.

The power supply unit 180 may receive external and/or internal power to provide power required for operation of the components under the control of the controller 190.

Various embodiments described herein may be implemented in a computer or similar device readable recording medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 190.

For software implementation, the embodiments such as procedures or functions described in the present disclosure may be implemented with separate software modules. Software codes can be implemented by a software application written in any suitable programming language. The software codes may be stored in the memory 170 and executed by the controller 190.

FIG. 2 is a flowchart illustrating an exemplary method of driving the display device according to an embodiment of the present invention. A description will be given of the method of driving the display device with reference to the attached drawings.

The controller 190 of the display device 100 selects a portion of a planar image output through the flat display means 150 (S100). Here, the portion of the planar image may be a planar image corresponding to a region of the screen of the flat display means 150 or a planar image corresponding to some image objects from among image objects included in the planar image. The portion of the planar image may be selected by a user or may be automatically selected by the controller 190 according to a predetermined standard. This will be described below in detail.

Upon selection of the portion of the planar image, the controller 190 obtains a holographic image with respect to the selected portion of the planar image (S110). The holographic image with respect to the selected portion of the planar image can be obtained on the basis of depth information about the selected portion of the planar image. This will be described below in detail.

Then, the controller 190 outputs the holographic image with respect to the selected portion of the planar image through the hologram generation means 155 (S120). Here, the controller 190 may output the entire planar image through the flat display means 150.

As described above, the display device 100 according to the present invention can output the planar image through the flat display means 150 and, simultaneously, output the holographic image with respect to at least a portion of the planar image through the hologram generation means 155. According to another embodiment of the present invention, the display device 100 may obtain a holographic image corresponding to the entire planar image and output the holographic image through the hologram generation means 155.

FIGS. 3 and 4 illustrate an example of outputting a holographic image corresponding to a portion of a 2D image, which is output through the flat display means, through the hologram generation means in the display device according to an embodiment of the present invention.

It can be seen from FIG. 3 that the display device 100 includes the flat display means 150 and the hologram generation means 155 located under the flat display means 150, and a holographic image of "apple" corresponding to an image object included in a 2D image output through the flat display means 150 is output through the hologram generation means 155.

The hologram generation means 155 is an optical plate system which is a floating hologram, a kind of pseudo-holography. Hologram technology used in the display device 100 according to the present invention is not limited to pseudo-hologram. This is the same in the following embodiments.

Referring to FIG. 4, according to hologram using the optical plate, light emitted from a projector is reflected by a mirror and passes through a Fresnel lens to reach user's eyes. The optical plate hologram is well-known in the art and thus detailed description thereof is omitted.

FIGS. 5 and 6 illustrate another example of outputting a holographic image corresponding to a portion of a 2D image, which is output through the flat display means, through the hologram generation means in the display device according to an embodiment of the present invention.

It can be seen from FIG. 5 that the display device 100 includes the flat display means 150 and the hologram generation means 155 located under the flat display means 150, and a holographic image of "apple" corresponding to an image object included in a 2D image output through the flat display means 150 is output through the hologram generation means 155.

The hologram generation means 155 employs a transmission type screen, one of pseudo hologram technologies, which is a kind of floating hologram. Referring to FIG. 6, according to the transmission type screen hologram, a 3D rendering image generated on a hologram screen according to light emitted from a projector is delivered to the user's eyes. The transmission type screen hologram is well-known in the art and thus detailed description thereof is omitted.

FIG. 7 is a flowchart illustrating another exemplary method of driving the display device according to an embodiment of the present invention. The method of driving the display device will be described with reference to the attached drawings.

A smart TV corresponding to the display device 100 according to the present invention is powered on (S200). Then, the controller 190 of the smart TV 100 receives content (S210) and identifies the format of the content (S220). If the content is 2D content corresponding to a 2D image (S230), the controller 190 determines whether the 2D content needs to be output without conversion (S240).

Upon determining that the 2D content needs to be output without conversion (YES) in step S240, the controller 190 determines output of the 2D content (S250) and drives a 2D mode module (S260) to play the content through the flat display means 150 (S270). Upon completion of playback of the content, the TV is powered off (S280). The 2D mode module may be part of the controller 190, part of a video signal processing means separated from the controller 190 or an independent module. This is the same in a 3D mode module and a floating hologram mode module which will be described below.

Upon determining that the 2D content is not output without conversion (NO) in step S240, the controller 190 determines whether the 2D content needs to be converted into a 3D stereoscopic image (S290).

Upon determining that the 2D content needs to be converted into a 3D stereoscopic image (YES) in step S290, the controller 190 determines that conversion of the 2D content into a 3D stereoscopic image and output of the 3D stereoscopic image (S300), drives the 3D mode module to convert the 2D content into the 3D stereoscopic image (S260) and displays the 3D stereoscopic image through the flat display means 150 (S270).

Upon determining that the 2D content need not be converted into a 3D stereoscopic image (NO) in step S290, the controller 190 determines conversion of the 2D content into a holographic image and output of the holographic image (S310), drives the floating hologram module to convert the 2D content into a holographic image (S320) and plays the holographic image through the hologram generation means 155 (S270). Here, the controller 190 may be outputting the 2D content through the flat display means 150.

When the received content is 3D stereoscopic content in step S220, the controller 190 determines whether the 3D stereoscopic content needs to be converted (S340). If it is determined that the 3D stereoscopic content need not be converted (NO) in step S340, the controller 190 can output the 3D stereoscopic content without conversion according to steps S300 and S270.

However, when it is determined that the 3D stereoscopic content needs to be converted (YES) in step S340, the controller 190 can convert the 3D stereoscopic content into a holographic image and output the holographic image according to steps S310, S320 and S270.

When the input content is floating holographic content in step S220, the controller 190 outputs the floating holographic content through the hologram generation means 155 according to steps S310, S320 and S270.

FIGS. 8 and 9 illustrate examples of setting an image output mode in the display device according to an embodiment of the present invention.

Referring to FIG. 8, the display device 100 can convert 2D content into holographic content and output the holographic content, convert the 2D content into 3D stereoscopic image and output the 3D stereoscopic image, or output the 2D content without conversion on the basis of operation of a remote controller 200 by a user. That is, the display device 100 can determine a format of output content according to selection of the user.

Referring to FIG. 9, the display device 100 can select conversion of music video content into holographic content and output of the holographic content or output of the music video content in the original content format according to operation of the remote controller 200 by the user. That is, the display device 100 can be set such that content of a specific type is automatically converted into holographic content and output according to selection of the user.

FIG. 10 is a flowchart illustrating a method of driving the display device according to an embodiment of the present invention to convert an image object included in a 2D image into a holographic image and output the holographic image. FIG. 11 illustrates an example of performing the method of driving the display device according to an embodiment of the present invention, illustrated in FIG. 10.

The controller 190 of the display device 100 converts a 2D image into a 3D stereoscopic image (S400). The 2D image may be received from the outside or may be stored in the display device 100. FIG. 11(*a*) illustrates an example of the 2D image.

The controller 190 obtains a depth map using the converted 3D stereoscopic image (S410). FIG. 11(*b*) illustrates acquisition of the depth map from the converted 3D stereoscopic image on the basis of the 2D image. If an image to be output through the display device 100 is originally a 3D stereoscopic image, the controller 190 can directly obtain a depth map from the 3D stereoscopic image.

The controller 190 selects an image object to be converted into a holographic image on the basis of the obtained depth map (S420). For example, the controller 190 can select an image object included in a predetermined depth value range as an image object to be converted into a holographic image with reference to the obtained depth map. FIG. 11(*c*) illustrates selection of a specific image object on the basis of the depth map of FIG. 11(*b*).

Upon selection of the image object, the controller 190 converts the selected image object into a holographic image and outputs the holographic image through the hologram generation means 155 (S430). The controller 190 can use depth map values (i.e., depth information) of the selected image object to convert the selected image object into a holographic image. FIG. 11(d) illustrates conversion of the selected specific image object into a holographic image and output of the holographic image.

FIGS. 12 to 16 illustrate examples of selecting an image object to be converted into a holographic image and output from among image objects included in a 2D image in the display device according to an embodiment of the present invention.

Referring to FIG. 12, the controller 190 of the display device 100 can select a car 150c on which a cursor 150d is located from among a mountain 150a, a person 150b and the car 150c included in a 2D image as an image object to be converted into a holographic image and output through the hologram generation means 155 on the basis of a selection signal transmitted from the remote controller 200.

When the flat display means 150 displaying the 2D image has a touchscreen function, the controller 190 may select the car 150c as an image object to be converted into a holographic image and output on the basis of touch applied to the car 150c.

Referring to FIG. 13, the controller 190 can set the car 150c selected by a user's gaze from among the images objects 150a, 150b and 150c included in the 2D image as an image object to be converted into a holographic image and output through the hologram generation means 155. Here, the controller 190 may select the car 150c at which the user gazes for a predetermined time on the basis of an analysis result with respect to an image captured by a camera.

Referring to FIG. 14, the controller 190 may set the car 150c selected by a user's gaze from among the images objects 150a, 150b and 150c included in the 2D image as an image object to be converted into a holographic image and output through the hologram generation means 155 on the basis of a user's gesture of unfolding the folded right arm.

Referring to FIG. 15, the controller 190 can select the car 150c included in a depth value range for selecting an image object to be converted into a holographic image and output through the hologram generation means 155 from among the images objects 150a, 150b and 150c included in the 2D image.

Referring to FIG. 16, the controller 190 can select the car 150c for which additional information is received from among the images objects 150a, 150b and 150c included in the 2D image. Here, additional information about image objects included in the 2D image may include information indicating an image object to be converted into a holographic image, image object description information, image object attribute information and the like. However, the scope of the present invention is not limited thereto.

FIG. 17 illustrates an example in which an object selected from a planar image is converted into a holographic image and output in the display device according to an embodiment of the present invention.

Referring to FIG. 17, the display device 100 can output the planar image through the flat display means 150 and, simultaneously, output a holographic image of the car 150c included in the planar image using the hologram generation means 155.

The controller 190 can output the holographic image larger than the car 150c included in the planar image. In addition, the controller 190 may provide additional information about the car displayed as a holographic image along with the holographic image. The controller 190 may display the additional information about the car through the flat display means 150. The additional information about the car may be received from the outside along with the planar image or may be received from the outside after the car is selected as an object to be converted into a holographic image.

The display device 100 according to an embodiment of the present invention has been described. A description will be given of a display device according to another embodiment of the present invention.

Recently, display technology for displaying 3D images has been reached and used in various fields. Particularly, electronic devices that display 3D images using 3D image display technology have attracted attention.

3D image display technology uses the principle of binocular parallax which allows an observer to feel 3D effects according to binocular parallax and can be divided into a shutter glass type, a glassless type and a full 3D type. Holography technology as a full 3D method provides natural 3D effects to observers by reproducing a 3D image based on a real image.

However, even though holography technology is the ultimate 3D imaging technology capable of solving limitations in expression of 3D images by stereoscopic imaging technology, it is difficult to technically implement holography technology. For example, holography technology requires thousands of spatial light modulators that insert light into a space to convert the light into information signals to generate hologram. Furthermore, to generate a real-time high-definition holographic image, a display device having super-high definition more than 250,000 times that of high-definition TV and extravagant data processing performance are required.

Therefore, there is need for realizable alternative technology since interest in and utilization of holograms are increasing. As such an alternative technology, technology for realizing a floating holographic image is drawing attention.

However, the current technology for realizing a floating holographic image has a very bulky structure and thus it is difficult to use the technology in various applications.

FIG. 18 illustrates a general floating hologram display device.

Referring to FIG. 18, the floating hologram display device may include a first display 10a providing a predetermined content image, a second display 10b providing a background image and arranged to be perpendicular to the first display 10a, and a semi-transmissive mirror 20 disposed at an angle of approximately 45 degrees to the ground.

The content image provided by the first display 10a can be reflected by the semi-transmissive mirror 20 and displayed as a holographic image 50 in front of the second display 10b.

Accordingly, a viewer 60 can view the holographic image 50 displayed in front of the second display 10b through the semi-transmissive mirror 20.

However, the first and second displays 10a and 10b arranged to be perpendicular to each other and the semi-transmissive mirror 20 arranged at an angle of about 45 degrees to the ground considerably increase the thickness D of the floating hologram display device.

The large volume of the floating hologram display device obstructs spread of the utilization range thereof.

FIG. 19 illustrates an example of a display device according to another embodiment of the present invention.

Referring to FIG. 19, a display device 200 may include a body 220 having a predetermined space 230 and a hologram generator 210 arranged in the predetermined space 230 of the body 220.

Here, the hologram generator 210 can generate a predetermined image and display a holographic image 240 in a front space of the body 220.

While the hologram generator 210 is usually arranged in the predetermined space 230 of the body, the hologram generator 210 may be located outside the body 220 as necessary.

In addition, the body 220 includes a small display 250 that displays information related to the displayed holographic image 240. A wired/wireless speaker that provides sounds related to the displayed holographic image 240 may be provided as necessary.

The hologram generator 210 may include an image generation unit for generating an image, a first mirror and a second mirror.

The first mirror can reflect an image to the front space of the body 220 such that the image is displayed as the holographic image 240, and the second mirror can reflect the image generated by the image generation unit to the first mirror.

Here, the depth between the front side and the rear side of the body 220 may be shorter than the height between the upper surface and the lower surface thereof.

For example, the ratio of the depth of the body 220 to the height of the body 220 may be in the range of 0.1:1 to 0.9:1.

In addition, the first mirror may be a curved mirror having a concave reflective face. However, the present invention is not limited thereto.

The second mirror may be a semi-transmissive mirror that reflects and transmits images. However, the present invention is not limited thereto.

Here, the second mirror may be arranged to be tilted relative to the front side of the body 220.

In this case, the angle between the mirror face of the second mirror facing the front side of the body 220 and the front side of the body 220 may be less than 45 degrees.

Furthermore, the image generation unit may project an image received through wired/wireless communication with a neighboring device.

Here, the image generation unit may be a projector or a monitor.

FIGS. 20, 21 and 22 illustrate the hologram generator of FIG. 19. FIG. 20 illustrates an example of the hologram generator according to another embodiment of the present invention, FIG. 21 illustrates another example of the hologram generator according to another embodiment of the present invention and FIG. 22 illustrates another example of the hologram generator according to another embodiment of the present invention.

As illustrated in FIGS. 20, 21 and 22, the hologram generator 210 may be arranged inside of the display device 200.

In this case, the hologram generator 210 may generate a predetermined image and display the holographic image 240 in a front space of the front side 220a of the display device 200.

The hologram generator 210 may include an image generation unit 212 for generating an image, a first mirror 216 and a second mirror 214.

The first mirror 216 can reflect the image to the front space of the front side 220a of the display device 200 to display the holographic image and the second mirror 214 can reflect the image generated by the image generation unit 212 to the first mirror 216.

The depth d1 between the front side and the rear side of the display device 100 may be shorter than the height h between the upper surface and the lower surface thereof.

For example, the ratio of the depth d1 of the body 220 to the height h of the body 220 may be in the range of 0.1:1 to 0.9:1.

In addition, the first mirror 216 may be a curved mirror having a concave reflective face. However, the present invention is not limited thereto.

The second mirror 214 may be a semi-transmissive mirror that reflects and transmits images. However, the present invention is not limited thereto.

Here, the second mirror 214 may be arranged to be tilted against the front side of the display device 200.

In this case, the angle between the mirror face of the second mirror 214 facing the front side 220a of the display device 200 and the front side 220a of the display device 200 may be less than 45 degrees.

Furthermore, the image generation unit 212 may project an image received through wired/wireless communication with a neighboring device. The image generation unit 212 may be a projector or a monitor.

Referring to FIG. 20, in the hologram generator 210, the first mirror 216 is arranged facing the front side 220a of the body of the display device 200 and the second mirror 214 is located between the front side 220a of the body and the first mirror 216 and may include a semi-transmissive face that reflects an image to the first mirror 216 and transmits an image reflected from the first mirror 216 to the front side 220a of the body.

In addition, the image generation unit 212 is arranged facing the semi-transmissive face of the second mirror 214 to project an image to the semi-transmissive face of the second mirror 214.

Here, the angle θ30 between the semi-transmissive face of the second mirror 214 and the front side 220a of the body may be between about 135 degrees and about 180 degrees.

Accordingly, the distance d1 between the first mirror 216 and the front side 220a of the body can determine the depth between the front side and the rear side of the body.

As described above, the depth d1 between the front side and the rear side of the body is remarkably reduced compared to the conventional depth d2.

Accordingly, the present invention can manufacture a slim hologram display device having a reduced depth by simplifying the arrangement structure of the optical system for generating holographic images.

Furthermore, the present invention can reduce the size of the device for generating holographic images by minimizing the depth of the device.

Referring to FIG. 21, the hologram generator 210 may have the first mirror 216 and the second mirror 214 which are arranged inside of a total reflector 218.

Although the image generation unit 212 is arranged outside the total reflector 218, the image generation unit 212 may be located inside of the body of the display device 200.

The total reflector 218 may be arranged on the front side of the display device 200.

In this case, the first mirror 216 is arranged at one end of the inside of the total reflector 218, and the second mirror 214 is arranged at the other end of the inside of the total reflector 218 and may include a reflective face that reflects an image projected from the image generation unit 212 to the first mirror 216.

Here, the angle θ40 between the reflective face of the second mirror 214 and the front side 220a of the body may be between about 135 degrees and about 180 degrees.

The total reflector 218 may include a total reflective face, which total reflects an image reflected from the second mirror 214 to the first mirror 216, inside thereof between the first mirror 216 and the second mirror 214.

Accordingly, the distance d1 between the end of the rear side of the image generation unit 212 and the front side 220a of the total reflector 218 can determine the depth between the front side and the rear side of the body.

Referring to FIG. 22, in the hologram generator 210, the first mirror 216 is arranged facing the front side of the body, and the second mirror 214 is arranged between the front side of the body and the first mirror 214, transmits an image input to the incident face to the first mirror 216 and transmits an image reflected from the first mirror 216 to the front side of the body to display the holographic image 240.

The image generation unit 212 is arranged such that the image projection face thereof faces the incident face of the second mirror 214 to project an image to the incident face of the second mirror 214.

Here, the angle θ50 between the incident face of the second mirror 214 and the front side of the body may be between about 45 degrees and about 90 degrees.

In addition, the face of image generation unit 212 opposite the image projection face may be arranged to be tilted at a predetermined angle to the lower surface of the body.

For example, the angle θ60 between the face of image generation unit 212 opposite the image projection face and the lower surface or the body may be between about 0 degrees and about 90 degrees.

The present invention configured as above can manufacture a slim hologram display device having a reduced depth by simplifying the arrangement structure of the optical system for generating holographic images.

Furthermore, the present invention can reduce the size of the device for generating holographic images by minimizing the depth of the device.

In addition, the present invention can receive images from neighboring devices in a wired or wireless manner and display the images as holographic images.

Moreover, the present invention can realize content related to an image displayed on the screen of a TV as a holographic image by embedding the hologram generator in the TV, arousing viewer interest.

FIG. 23 illustrates examples of holographic images displayed through the display device according to another embodiment of the present invention.

Referring to FIG. 23, the display device 200 can display a holographic image 240 inside and outside of a space 230 of the body 220 through the hologram generator included therein.

Here, the holographic image 240 may be natural content such as a fishbowl, as shown in FIG. 23(a), content useful for practical life, such as an alarm clock, as shown in FIG. 23(b), functional content such as an audio equalizer, as shown in FIG. 23(c) or game content such as avatars, as shown in FIG. 23(d).

In this manner, the present invention can display various types of content necessary for practical life as holographic images 240 by miniaturizing the display device 200, to thereby provide convenience to viewers and arouse viewer interest.

FIG. 24 illustrates an example of a holographic image of a display device associated with neighboring devices.

Referring to FIG. 24, the display device 200 may perform wireless communication with a neighboring fixed terminal 70 or mobile terminal 80 to receive an image displayed through the fixed terminal 70 or the mobile terminal and display the received image as a holographic image 240.

That is, the hologram generator included in the display device can receive the image from the fixed terminal 70 or the mobile terminal 80 and display the holographic image 240 inside or outside of the space 230 of the body 220.

Here, content such as an SNS related chat window and an emoticon may be displayed as the holographic image 240.

Accordingly, the present invention can provide convenience to viewers and arouse viewer interest.

FIG. 25 is a cross-sectional view of the display device to which the hologram generator shown in FIG. 21 is applied.

Referring to FIG. 25, the total reflector 218 of the display device 200 may be located on the front side of the body 220.

Here, the first mirror 216 and the second 214 can be arranged inside of the total reflector 218.

While the image generation unit 212 is arranged outside the total reflector 218, the image generation unit 212 may be arranged inside of the body 220 of the display device 200.

Here, the image generation unit 212 may be arranged in proximity to the second mirror 214 located at the end of the total reflector 218.

That is, the first mirror 216 is arranged at one end of the inside of the total reflector 218 and the second mirror 214 is arranged at the other end of the inside of the total reflector 218 and may include a reflective face that reflects an image input from the image generation unit 212 to the first mirror 216.

The total reflector 218 may include a total reflective face, which total reflects an image reflected from the second mirror 214 to the first mirror 216, inside thereof between the first mirror 216 and the second mirror 214.

Accordingly, an image projected from the image generation unit 212 can be reflected by the second mirror 214, reflected along the total reflective face of the total reflector 218 to be input to the first mirror 216 and then reflected by the mirror 216 to be displayed as a holographic image 250 in front of the body 220.

The distance d1 between the end of the rear side of the image generation unit 212 and the front side of the total reflector 218 can determine the depth between the front side and the rear side of the body 220.

Accordingly, the present invention can minimize the size of the device for generating a holographic image by minimizing the depth of the device.

FIGS. 26 and 27 illustrate an example of the display device according to another embodiment of the present invention.

As illustrated in FIGS. 26 and 27, the display device 200 may include a display unit 300, the hologram generator 210 and the controller 190.

The display unit 300 may be a display for displaying a predetermined image.

For example, the display unit 300 may be one of an LCD, a TFT-LCD, an OLED display, a flexible display and a 3D display, some of which may be configured as a transparent or light transmissive display through which the outside can be seen.

The hologram generator 210 is arranged at one side of the display unit 300 and can generate a predetermined image and display the image as a holographic image 240 in front of the display unit 300.

The controller 190 can control the display unit 300 and the hologram generator 210 to display content related to the image displayed on the display unit 300 to be displayed as the holographic image 240.

The hologram generator 210 may include an image generation unit for generating an image according to a control signal of the controller 190, a first mirror for reflecting the image to the front space of the display unit 300 such that the image is displayed as the holographic image 240 and a second mirror for reflecting the image generated by the image generation unit to the first mirror.

Referring to FIG. 26, the display device 200 may receive an image captured in an external conference room 500 through wireless communication and display the received image through the display unit 300.

The hologram generator of the display device 200 may extract only participants of the conference from the image displayed through the display unit 300 according to a control signal of the controller 190 and display the extracted participants as a holographic image 240.

Accordingly, a viewer can view the conference image displayed through the display unit 300 and, simultaneously, view the holographic image 240 of the conference participants, projected from the hologram generator 210.

Referring to FIG. 27, the display device 200 may receive advertisement images about predetermined products and display the advertisement images on the display unit 300.

The hologram generator 210 of the display device 200 may extract only a predetermined product from the advertisement images displayed on the display unit 300 and display the product as a holographic image 240.

For example, when the display unit 300 displays a shoe advertisement image, the hologram generator 210 can display specific shoes appearing on the shoe advertisement image as the holographic image 240.

Accordingly, the viewer can view the advertisement image displayed through the display unit 300 and, simultaneously, view the holographic image 240 of the advertisement related product through the hologram generator 210.

FIG. 28 illustrates another example of the display device to which the hologram generator shown in FIG. 22 is applied. FIG. 28(*a*) is a perspective view and FIG. 28(*b*) is a cross-sectional view.

As illustrated in FIG. 28, the display device 200 can be configured as a wall-hanged frame type device.

In this case, the hologram generator 210 can be constructed in such a manner the first mirror 216 is arranged facing the front side of the body and the second mirror 214 is arranged between the front side of the body and the first mirror 216.

The second mirror 214 can transmit an image input from the image generation unit 212 to the first mirror 216 and transmit an image reflected from the first mirror to the front side of the body to display a holographic image 240.

Here, the image generation unit 212 is arranged such that the image projection face thereof faces the incident face of the second mirror 214 to project an image onto the incident face of the second mirror 214.

The angle between the incident face of the second mirror 214 and the front side of the body may be between about 45 degrees and about 90 degrees.

In addition, the image generation unit 212 may be arranged such that the face opposite the image projection face is tilted at a predetermined angle relative to the lower surface of the body.

For example, the angle between the face of the image generation unit 212 opposite the image projection face and the lower surface of the body may be between about 0 degrees and about 90 degrees.

FIG. 29 illustrates an example of the frame type display device shown in FIG. 28. FIG. 29(*a*) illustrates a holographic image displayed through the frame type display device and FIG. 29(*b*) illustrates the frame type display device attached to a wall.

As illustrated in FIG. 29, the display device 200 can be manufactured as a slim display device since the hologram generator 210 having the optical structure as shown in FIG. 22 is included therein.

Accordingly, the display device 200 according to the present invention can display various types of content as holographic images without occupying a large space because the display device 200 can be attached to a wall.

As described above, the present invention can manufacture a slim floating hologram display device by simplifying the arrangement structure of the optical system for generating holographic images.

Furthermore, the present invention can reduce the size of the device for generating holographic images by minimizing the depth of the device, extending the application range of the device.

In addition, the present invention can receive images from neighboring devices in a wireless manner and display the images as holographic images. Moreover, the present invention can realize content related to an image displayed on the screen of a TV as a holographic image by embedding the hologram generator in the TV, arousing viewer interest.

The display device 200 according to another embodiment of the present invention has been described. A description will be given of a display device according to another embodiment of the present invention.

FIG. 30 illustrates an example of a display device according to another embodiment of the present invention.

As illustrated in FIG. 30, the display device may include an upper plate 10-1, a lower plate 10-2, a connector 30, an image projector 90, a mirror 40 and a scanning screen 51.

Here, the upper plate 10-1 and the lower plate 10-2 may be separated from each other by a predetermined distance and arranged in parallel with each other.

One end of the upper plate 10-1 may be connected to the connector 30 and the other end of the upper plate 10-1 may have a protrusion 12 projected to the lower plate 10-2.

The protrusion 12 of the upper plate 10-1 may include a first surface facing the image projector 90 and a second surface opposite the first surface.

Here, the first surface may be inclined at a predetermined angle to the lower surface of the upper plate 10-1.

For example, the angle between the first surface of the projection 12 and the lower surface of the upper plate 10-1 is in the range of 10 to 80 degrees.

The first surface of the protrusion 12 is inclined in order to change the path of light projected from the image projector 90 in parallel with the upper plate 10-1 to the direction of the scanning screen 51 located under the upper plate 10-1.

The first surface of the protrusion 12 may be inclined at an angle that makes the optical axis 94 of light projected from the image projector 90 correspond to the rotation axis of the scanning screen 51 by being reflected by the mirror 40.

For example, the inclination angle of the first surface of the protrusion 12 can be determined such that the angle between the optical axis 94 of light projected from the image projector 90 and the rotation axis 92 of the scanning screen becomes a right angle.

Accordingly, when the optical axis 94 of light projected from the image projector 90 is fixed and the position of the rotation axis 92 of the scanning screen 51 is variable, the inclination angle of the first surface of the protrusion 12 can be varied according to the position of the rotation axis 92 of the scanning screen 51.

If the position of the rotation axis 92 of the scanning screen 51 is fixed and the optical axis 94 of light projected from the image projector 90 is variable, the inclination angle of the first surface of the protrusion 12 can be varied according to the position of the optical axis 94 of light projected from the image projector 90.

The second surface of the protrusion 12 may be inclined at a predetermined angle to the lower surface of the upper plate 10-1.

Here, the angle between the second surface of the projection 12 and the lower surface of the upper plate 10-1 is in the range of 10 to 80 degrees. However, the present invention is not limited thereto.

The second surface of the protrusion 12 is inclined in order to illuminate the area around the scanning screen 51 located under the upper plate 10-1 through a light source provided to the second surface.

Accordingly, the inclination angle of the second surface of the protrusion 12 can be varied according to a region to be illuminated.

For example, the inclination angle of the second surface of the protrusion 12 can decrease as the region to be illuminated approaches the scanning screen 51 and increase as the region to be illuminated moves away from the scanning screen 51.

As described above, the mirror 40 can be provided to the first surface of the protrusion 12 to execute a function of realizing a holographic image 240 and the light source can be provided to the second surface to execute an illuminating function.

Accordingly, the first surface and the second surface of the protrusion 12 may have different gradients because they execute different functions.

That is, the angle between the first surface of the protrusion 12 and the lower surface of the upper plate 10-1 may differ from the angle between the second surface of the protrusion 12 and the lower surface of the upper plate 10-1.

For example, the angle between the first surface of the protrusion 12 and the lower surface of the upper plate 10-1 may be smaller than the angle between the second surface of the protrusion 12 and the lower surface of the upper plate 10-1.

The angle between the first surface of the protrusion 12 and the lower surface of the upper plate 10-1 may be identical to the angle between the second surface of the protrusion 12 and the lower surface of the upper plate 10-1.

The mirror 40 can be arranged on the first surface of the protrusion 12. The mirror 40 may be a fold mirror for reflecting an image projected from the image projector 90.

The light source can be arranged on the second surface of the protrusion 12.

The light source may use various lamps such as a light emitting diode (LED), a laser diode (LD), an incandescent lamp, a fluorescent lamp and a neon lamp.

One end of the upper plate 10-1 can be connected to the end of the connector 30.

Here, the upper plate 10-1 and the connector 30 can be connected by a hinge, and the upper plate 10-1 can rotate using the hinge as a rotation axis.

The range of rotation angle of the upper plate 10-1 may be approximately 0 to 135 degrees. However, the present invention is not limited thereto.

One end of the connector 30 may be connected to the upper plate 10-1 and the other end thereof may be connected to the lower plate 10-2.

The length of the connector 30 can determine the size of the space between the upper plate 10-1 and the lower plate 10-2.

The connector 30 may include a part for fixing the image projector 90 at one end thereof adjacent to the upper plate 10-1.

The fixing part may be projected from the side of the connector 30 to the mirror 40.

One side of the image projector 90 is fixed to the fixing part. The rear side of the image projector 90 opposite an image projection face can be connected and fixed to the fixing part.

In addition, a small display for displaying information about the displayed holographic image 240 may be provided to the connector 30, and a wired/wireless speaker for providing sounds related to the display holographic image 240 may be provided to the connector 30 as necessary.

The image projector 90 may project an image received through wired/wireless communication with a neighboring device.

The image projector 90 may be a projector or a monitor.

Furthermore, the image projector 90 may be a display capable of representing volume. In this case, an image projected from the image projector 90 can be displayed as a holographic image 240 having a volume according to the scanning screen 51.

Here, the image projector 90 is a display capable of representing volume and may be a rotary screen volumetric 3D display, a layered 3D display, an integral imaging based 3D display, a hologram based 3D display or the like.

The image projector 90 is connected to the fixed part provided to the end of the connector 30 and may be rotated about the rotation axis of the fixing part.

Here, the rotation angle of the image projector 90 may be in the range of 0 to 90 degrees. However, the present invention is not limited thereto.

In addition, the image projector 90 may be rotated when the upper plate 10-1 and the lower plate 10-2 are not arranged in parallel.

That is, the image projector 90 cannot be rotated when the upper plate 10-1 is arranged in parallel with the lower plate 10-2 because light projected from the image projector 90 is reflected by the mirror 40 to the lower plate 10-2 due to the protrusion 12 of the upper plate 10-1 when the upper plate 10-1 is arranged in parallel with the lower plate 10-2.

Accordingly, when the image projector 90 needs to display a 2D image instead of the holographic image 240, the upper plate 10-1 can be rotated such that the protrusion 12 of the upper plate 10-1 does not cover the projection face of the image projector 90 to project an image onto a screen located in front of the image projector 90.

When the screen is located in front of or above the image projector 90 and the image projector 90 needs to be rotated toward the screen, the upper plate 10-1 can be rotated such that the protrusion 12 of the upper plate 10-2 does not cover the projection face of the image projector 90.

Here, the image projector 90 and the upper plate 10-1 may be rotated in the same direction.

When the image projector 90 needs to display a 2D image instead of the holographic image 240, the upper plate 10-1 can be rotated such that the protrusion 12 of the upper plate 10-2 does not cover the projection face of the image projector 90.

When the screen is located in front of the projection face of the image projector 90, the image projector is not rotated.

When the screen is located above the projection face of the image projector 90, however, the image projector 90 can be rotated upward.

When the image projector 90 is rotated upward, the upper plate 10-1 may be rotated simultaneously with the image projector 90.

Accordingly, the image projector 90 and the upper plate 10-1 can be simultaneously rotated.

Here, the rotation angle of the image projector 90 may differ from the rotation angle of the upper plate 10-1.

For example, the rotation angle of the upper plate 10-1 can be greater than the rotation angle of the image projector 90 in order not to cover the projection face of the image projector 90.

A rotary motor 81 for rotating the scanning screen 51 may be provided to the lower plate 10-2.

The controller 190 can control the rotary motor 81 to adjust the rate of rotation of the scanning screen 51.

The scanning screen 51 can rotate about the rotation axis 92 perpendicular to the surface of the lower plate 10-2.

Here, the scanning screen 51 can reflect the image reflected by the mirror 40 to the space between the upper plate 10-1 and the lower plate 10-2 and display the holographic image 240 according to rotation.

Accordingly, a viewer 60 can view the holographic image 240 displayed in the space.

Furthermore, the controller 190 can control the rate of rotation of the scanning screen 51 depending on the image projected from the image projector 90.

The controller 190 can control the rotary motor 81 to rotate the scanning screen 51 when the upper plate 10-1 is arranged in parallel with the lower plate 10-2.

That is, when the upper plate 10-1 is arranged in parallel with the lower plate 10-2 and thus the protrusion 12 of the upper plate 10-1 covers the projection face of the image projector 90, the controller 190 can rotate the scanning screen 51 upon determining that the current mode is a holographic image display mode.

If the upper plate 10-1 is not arranged in parallel with the lower plate 10-2, the controller 190 may not rotate the scanning screen 51 upon determining that the current mode is not the holographic image display mode.

In this manner, the controller 190 can control the scanning screen 51 and the image projector 90 depending on the mode of the display device.

For example, upon determining that the upper plate 10-1 and the lower plate 10-2 are arranged in parallel through a sensor signal or the like, the controller 190 can determine the holographic image display mode, control the image projector 90 to project an image for generating the holographic image 240 and control the rotary motor 81 to rotate the scanning screen 51.

In addition, upon determining that the upper plate 10-1 and the lower plate 10-2 are not arranged in parallel through a sensor signal or the like, the controller 190 can determine a normal image display mode, control the image projector 90 to project a normal image and control the rotary motor 81 not to rotate the scanning screen 51.

Upon reception of an illumination request signal, the controller 190 can determine an illumination mode and drive the light source provided to the protrusion 12 of the upper plate 10-1 to emit light.

Here, in the illumination mode, the controller 190 may drive only the light source to execute only the illumination mode, simultaneously execute the illumination mode and the holographic image display mode, or simultaneously execute the illumination mode and the normal image display mode.

As described above, the present invention can manufacture a slim display device by simplifying the arrangement structure of the optical system for generating holograms.

In addition, the present invention can provide the light source for illumination to the upper plate to realize the holographic image 240 and to execute the illumination function of illuminating the area around the holographic image 240.

Furthermore, the upper plate and the image projector are connected to be rotated in a specific direction, and thus the image projector can execute a projector function for realizing a normal image in addition to the holographic image 240.

FIG. 31 illustrates the upper plate of FIG. 30 in detail.

As illustrated in FIG. 31, one end 10-1$a$ of the upper plate 10-1 can be connected to the connector 30 and the other end 10-1$b$ of the upper plate 10-1 can have the protrusion 12 projected downward.

The protrusion 12 of the upper plate 10-1 can include the first surface 12$a$ facing the image projector 90 and the second surface 12$b$ opposite the first surface 12$a$.

Here, the first surface 12$a$ may be inclined at a predetermined angle to the lower surface 10$c$ of the upper plate 10-1.

For example, the angle $\theta 1$ between the first surface 12$a$ of the protrusion 12 and the lower surface 10$c$ of the upper plate 10-1 can be in the range of 10 to 80 degrees.

The first surface 12$a$ of the protrusion 12 is inclined in order to change the path of light projected from the image projector 90 in parallel with the upper plate 10-1 to the direction of the scanning screen located under the upper plate 10-1.

The second surface 12$b$ of the protrusion 12 may be inclined at a predetermined angle to the lower surface 10$c$ of the upper plate 10-1.

Here, the angle between the second surface 12$b$ of the projection 12 and the lower surface 10$c$ of the upper plate 10-1 is in the range of 10 to 80 degrees. However, the present invention is not limited thereto.

The second surface 12$b$ of the protrusion 12 is inclined in order to illuminate the area around the scanning screen located under the upper plate 10-1 through a light source 45 provided to the second surface 12$b$.

As described above, the mirror 40 can be provided to the first surface 12$a$ of the protrusion 12 to execute a function of realizing a holographic image 240 and the light source 45 can be provided to the second surface 12$b$ of the protrusion 12 to execute an illuminating function.

Accordingly, the first surface 12$a$ and the second surface 12$b$ of the protrusion 12 may have different gradients because they execute different functions.

That is, the angle $\theta 1$ between the first surface 12$a$ of the protrusion 12 and the lower surface 10$c$ of the upper plate 10-1 may differ from the angle $\theta 2$ between the second surface 12$c$ of the protrusion 12 and the lower surface 10$c$ of the upper plate 10-1.

For example, the angle $\theta 1$ between the first surface 12$a$ of the protrusion 12 and the lower surface 10$c$ of the upper plate 10-1 may be smaller than the angle $\theta 2$ between the second surface 12$b$ of the protrusion 12 and the lower surface 10$c$ of the upper plate 10-1.

The angle $\theta 1$ between the first surface 12$a$ of the protrusion 12 and the lower surface 10$c$ of the upper plate 10-1 may be identical to the angle $\theta 2$ between the second surface 12$b$ of the protrusion 12 and the lower surface 10$c$ of the upper plate 10-1 as necessary.

The mirror 40 can be arranged on the first surface 12$a$ of the protrusion 12. The mirror 40 may be a fold mirror for reflecting an image projected from the image projector 90.

The light source 45 can be arranged on the second surface of the protrusion 12. The light source may use various lamps such as a light emitting diode (LED), a laser diode (LD), an incandescent lamp, a fluorescent lamp and a neon lamp.

One end 10-1 *a* of the upper plate 10-1 can be connected to the end of the connector 30.

Here, the upper plate 10-1 and the connector 30 can be connected by a hinge 35, and the upper plate 10-1 can rotate using the hinge 35 as a rotation axis.

The range of rotation angle of the upper plate 10-1 may be approximately 0 to 135 degrees. However, the present invention is not limited thereto.

The image projector 90 may project an image received through wired/wireless communication with a neighboring device.

The image projector 90 may be a projector or a monitor.

Furthermore, the image projector 90 may be a display capable of representing volume. In this case, an image projected from the image projector 90 can be displayed as a holographic image 240 having a volume according to the scanning screen 51.

Here, the image projector 90 is a display capable of representing volume and may be a rotary screen volumetric 3D display, a layered 3D display, an integral imaging based 3D display, a hologram based 3D display or the like.

The image projector 90 is connected to a hinge 95 of the fixed part provided to the end of the connector 30 and may be rotated about the rotation axis of the hinge 95 of the fixing part.

Here, the rotation angle of the image projector 90 may be in the range of 0 to 90 degrees. However, the present invention is not limited thereto.

FIG. 32 illustrates an example of rotation of the upper plate.

As illustrated in FIG. 32, the upper plate 10-1 and the connector 30 can be connected by the hinge 35, and the upper plate 10-1 can rotate using the hinge 35 as a rotation axis.

The range of rotation angle θ10 of the upper plate 10-1 may be approximately 0 to 135 degrees. However, the present invention is not limited thereto.

When the image projector 90 needs to display a normal 2D image without generating the holographic image 240, the upper plate 10-1 can be rotated such that the protrusion 12 of the upper plate 10-1 does not cover the projection face of the image projector 90.

Accordingly, the image projector 90 can project images to the screen located in front of the projection face.

FIG. 33 illustrates the display device in the normal image display mode.

As illustrated in FIG. 33, the display device 190 in the normal image display mode may include the upper plate 10-1 having a protrusion, the lower plate 10-2 having a rotary motor, the connector 30, the image projector 90 and the scanning screen 51.

Here, the upper plate 10-1 and the connector 30 can be connected by a hinge 35, and the upper plate 10-1 can rotate using the hinge 35 as a rotation axis.

The range of rotation angle of the upper plate 10-1 may be approximately 0 to 135 degrees. However, the present invention is not limited thereto.

One end of the connector 30 may be connected to the upper plate 10-1 and the other end thereof may be connected to the lower plate 10-2.

The length of the connector 30 can determine the size of the space between the upper plate 10-1 and the lower plate 10-2.

The connector 30 may include a part for fixing the image projector 90 at one end thereof adjacent to the upper plate 10-1.

One side of the image projector 90 is fixed to the fixing part. The rear side of the image projector 90 opposite an image projection face can be connected to the hinge 95 of the fixing part and rotated.

That is, the image projector 90 is connected to the hinge 95 of the fixing part provided to the end of the connector 30 and can be rotated about the rotation axis of the hinge 95 of the fixing part.

Here, the rotation angle of the image projector 90 may be in the range of 0 to 90 degrees. However, the present invention is not limited thereto.

In addition, the image projector 90 may be rotated when the upper plate 10-1 and the lower plate 10-2 are not arranged in parallel.

That is, the image projector 90 cannot be rotated when the upper plate 10-1 is arranged in parallel with the lower plate 10-2 because light projected from the image projector 90 is reflected by the mirror to the lower plate 10-2 due to the protrusion of the upper plate 10-1 when the upper plate 10-1 is arranged in parallel with the lower plate 10-2.

Accordingly, when the image projector 90 needs to display a 2D image instead of the holographic image 240, the upper plate 10-1 can be rotated such that the protrusion 12 of the upper plate 10-1 does not cover the projection face of the image projector 90 to project an image onto a screen located in front of the image projector 90.

When the screen is located in front of or above the image projector 90 and the image projector 90 needs to be rotated toward the screen, the upper plate 10-1 can be rotated such that the protrusion 12 of the upper plate 10-2 does not cover the projection face of the image projector 90.

Here, the image projector 90 and the upper plate 10-1 may be rotated in the same direction.

When the image projector 90 needs to display a 2D image without generating the holographic image 240, the upper plate 10-1 can be rotated such that the protrusion 12 of the upper plate 10-2 does not cover the projection face of the image projector 90.

When the screen is located in front of the projection face of the image projector 90, the image projector 90 is not rotated.

When the screen is located above the projection face of the image projector 90, however, the image projector 90 can be rotated upward.

When the image projector 90 is rotated upward, the upper plate 10-1 may be rotated simultaneously with the image projector 90.

Accordingly, the image projector 90 and the upper plate 10-1 can be simultaneously rotated.

Here, the rotation angle of the image projector 90 may differ from the rotation angle of the upper plate 10-1.

For example, the rotation angle of the upper plate 10-1 can be greater than the rotation angle of the image projector 90 in order not to cover the projection face of the image projector 90.

As described above, the present invention can determine the holographic image display mode, control the image projector 90 to project an image for realizing the holographic image 240 and control the rotary motor 81 to rotate the scanning screen 51 upon determining that the upper plate 10-1 and the lower plate 10-2 are arranged in parallel.

In addition, the present invention can determine the normal image display mode, control the image projector 90 to project a normal image and control the rotary motor 81 not to rotate the scanning screen 51 upon determining that the upper plate 10-1 and the lower plate 10-2 are not arranged in parallel.

FIG. 34 illustrates a rotational relation between the upper plate and the image projector.

As illustrated in FIG. 34, the upper plate 10-1 and the connector 30 can be connected by the hinge 35 and the upper plate 10-1 can be rotated using the hinge 35 as a rotation axis.

The image projector 90 is connected to the hinge 95 of the fixing part provided to the end of the connector 30 and may be rotated about the rotation axis of the hinge 95 of the fixing part.

When a normal image instead of the holographic image 240 needs to be displayed, the upper plate 10-1 is rotated by a predetermined angle using the hinge 35 as a rotation axis, as shown in FIG. 34(*a*).

Here, the projection face of the image projector 90 is covered by the protrusion of the upper plate 10-1 if the upper plate 10-1 is not rotated. When the upper plate 10-1 is rotated, the projection face is not covered by the protrusion of the upper plate 10-1.

Accordingly, the image projector 90 can project an image to the screen located in front thereof.

When the screen is located above the front of the image projector 90, as shown in FIG. 34(*b*), the image projector 90 can be rotated by a predetermined angle using the hinge 95 as a rotation axis.

Here, the rotation angle of the image projector 90 can be adjusted depending on the position of the screen.

In addition, when the image projector 90 is rotated using the hinge 95 as a rotation angle, the upper plate 10-1 can be further rotated by a degree of rotation of the image projector 90 because the protrusion of the upper plate 10-1 may cover the projection face of the image projector 90 due to rotation of the image projector 90.

Accordingly, the image projector 90 and the upper plate 10-1 can be simultaneously rotated.

Here, the rotation angle of the image projector 90 may differ from the rotation angle of the upper plate 10-1.

For example, the rotation angle of the upper plate 10-1 may be greater than the rotation angle of the image projector 90 in order to prevent the protrusion 12 of the upper plate 10-1 from covering the projection face of the image projector 90.

When the screen is located above the image projector 90, as shown in FIG. 34(*c*), the image projector 90 can be rotated by 90 degrees using the hinge 95 as a rotation axis.

Here, the rotation angle of the image projector 90 can be adjusted depending on the position of the screen.

In addition, when the image projector 90 is rotated using the hinge 95 as a rotation angle, the upper plate 10-1 can be further rotated by a degree of rotation of the image projector 90 because the protrusion of the upper plate 10-1 may cover the projection face of the image projector 90 due to rotation of the image projector 90.

Accordingly, the image projector 90 and the upper plate 10-1 can be simultaneously rotated.

Here, the rotation angle of the image projector 90 may differ from the rotation angle of the upper plate 10-1.

For example, the rotation angle of the upper plate 10-1 may be greater than the rotation angle of the image projector 90 in order to prevent the protrusion 12 of the upper plate 10-1 from covering the projection face of the image projector 90.

As described above, the upper plate and the image projector are connected such that they are rotated in a specific direction, and thus the image projector can execute a projector function of displaying a normal image in addition to the function of realizing the holographic image 240.

FIG. 35 illustrates the display device in the illumination mode.

As illustrated in FIG. 35, the display device 190 in the illumination mode may include the upper plate 10-1 having the protrusion 12, the lower plate 10-2 having the rotary motor 81, the image projector 90 and the scanning screen 51.

The protrusion 12 of the upper plate 10-1 can include the first surface 12*a* facing the image projector 90 and the second surface 12*b* opposite the first surface 12*a*.

Here, the first surface 12*a* may be inclined at a predetermined angle to the lower surface 10*c* of the upper plate 10-1.

The first surface 12*a* of the protrusion 12 is inclined in order to change the path of light projected from the image projector 90 in parallel with the upper plate 10-1 to the direction of the scanning screen located under the upper plate 10-1.

The second surface 12*b* of the protrusion 12 may be inclined at a predetermined angle to the lower surface 10*c* of the upper plate 10-1.

Here, the angle between the second surface 12*b* of the projection 12 and the lower surface 10*c* of the upper plate 10-1 is in the range of 10 to 80 degrees. However, the present invention is not limited thereto.

The second surface 12*b* of the protrusion 12 is inclined in order to illuminate the area around the scanning screen 51 located under the upper plate 10-1 through the light source 45 provided to the second surface 12*b*.

Accordingly, the inclination angle of the second surface 12*b* of the protrusion 12 can be varied according to the region to be illuminated.

For example, the inclination angle of the second surface 12*b* of the protrusion 12 can decrease as the region to be illuminated approaches the scanning screen 51 and increase as the region to be illuminated moves away from the scanning screen 51.

As described above, the mirror 40 can be provided to the first surface 12*a* of the protrusion 12 to execute the function of realizing the holographic image 240 and the light source 45 can be provided to the second surface 12*b* of the protrusion 12 to execute the illuminating function.

Accordingly, the first surface 12*a* and the second surface 12*b* of the protrusion 12 may have different gradients since they execute different functions.

The light source 45 may use various lamps such as a light emitting diode (LED), a laser diode (LD), an incandescent lamp, a fluorescent lamp and a neon lamp.

As described above, the present invention can drive the light source 45 provided to the protrusion 12 of the upper plate 10-1 to emit illumination light 46 when illumination is requested.

Here, in the illumination mode, the present invention may drive only the light source 45 to execute only the illumination mode, drive the light source 45, the image projector 90 and the scanning screen 51 to simultaneously execute the illumination mode and the holographic image display mode, or rotate the upper plate 10-1 and drive the light source 45 and the image projector 90 to simultaneously execute the illumination mode and the normal image display mode.

As described above, the present invention can provide the light source for illumination to the upper plate so as to realize the holographic image 240 and execute the illumination function simultaneously.

The present invention can manufacture a slim floating hologram display device by simplifying the arrangement structure of the optical system for generating a floating hologram.

Furthermore, the present invention can generate a holographic image and execute the illumination function, simultaneously, by providing the light source for illumination to the upper plate.

In addition, according to the present invention, the upper plate and the image projector are connected such that they are rotated in a specific direction and thus the image projector can execute the projector function for displaying a normal image in addition to the hologram image display function.

The methods of driving the display devices 100 and 200 according to embodiments of the present invention may be implemented in the form of a program that may be executed through various computer means and recorded in a computer-readable medium. The computer-readable recording medium may include a program command, a data file, a data structure, and the like, alone or in a form of a combination thereof. A program recorded in the medium may be particularly designed or configured for the present invention or may be known to be used by a computer software person in the art.

Examples of the computer-readable recording medium include a hardware device particularly configured to store and perform a program command, such as a magnetic medium such as a hard disk, a floppy disk, or a magnetic tape, an optical medium such as a CD-ROM or a DVD, a magneto-optical medium such as a floptical disk, and a ROM, a RAM, a flash data storage unit, or the like. Examples of program commands include high level language codes that may be executed by a computer using an interpreter, or the like, as well as mechanical language codes created by a compiler. The hardware device may be configured to operate by one or more software modules to perform processing according to an exemplary embodiment of the present disclosure, and vice versa.

Hereinabove, although the present invention is described by specific matters, exemplary embodiments, and drawings, the present invention is not limited to the exemplary embodiments and various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

The invention claimed is:

1. A display device comprising:
   a flat display unit configured to output a planar image;
   a hologram generation unit configured to output a hologram image;
   a controller configured to acquire the holographic image with respect to the planar image;
   an upper plate;
   a lower plate separated and arranged having a predetermined space from the upper plate;
   a connector configured to connect one side of the upper plate and to one side of the lower plate;
   an image projector arranged at an end of the connector and configured to project the at least the portion of the planar image;
   a mirror arranged on the upper plate and configured to reflect the planar image to the lower plate; and
   a scanning screen arranged on the lower plate and configured to project the image reflected from the mirror to the predetermined space between the upper plate and the lower plate to display the holographic image,
   wherein the scanning screen rotates about a rotation axis perpendicular to a surface of the lower plate,
   wherein a protrusion is formed at one side of the upper plate and projected downward from the upper plate,
   wherein the protrusion of the upper plate includes a first surface facing the image projector and a second surface opposite the first surface, and
   wherein an angle θ1 between the first surface of the protrusion and a lower surface of the upper plate differ from an angle θ2 between the second surface of the protrusion and the lower surface of the upper plate.

2. The display device according to claim 1, wherein the controller is configured to acquire depth information from the planar image and to obtain the holographic image with respect to the planar image on the basis of the acquired depth information.

3. The display device according to claim 2, wherein the controller is configured to select a specific image object included in the planar image and to acquire a holographic image of the selected image object on the basis of depth information of the selected image object.

4. The display device according to claim 3, wherein the controller is configured to select the specific image object from among image objects included in the planar image on the basis of depth information of the image objects included in the planar image.

5. The display device according to claim 3, wherein the controller is configured to select the specific image object from among image objects included in the planar image on the basis of a gesture of a user, a gaze of the user, operation of a remote controller by the user, or touch of the user through the flat display unit including a touchscreen function.

6. The display device according to claim 3, wherein the controller is configured to select the specific image object from among image objects included in the planar image on the basis of additional information about the image objects included in the planar image.

7. The display device according to claim 1, wherein the hologram generation unit comprises:
   an image generation unit configured to generate the planar image;
   a first mirror configured to reflect the generated planar image; and
   a second mirror configured to reflect the image reflected by the first mirror to a front space of the flat display unit to display the holographic image.

8. The display device according to claim 1, wherein the controller is configured to activate rotation of the scanning screen to output the holographic image upon determining that the upper plate and the lower plate are parallel with each other.

9. The display device according to claim 1, wherein the controller is configured to deactivate rotation of the scanning screen to output the planar image upon determining that the upper plate and the lower plate are not parallel with each other.

10. The display device according to claim 1, further comprising:
   a light source provided on the protrusion and maintaining a predetermined angle to the downward direction, wherein the controller is configured to activate the light source upon determining that an illumination request signal is received.

* * * * *